US011649331B2

(12) United States Patent
Lue et al.

(10) Patent No.: US 11,649,331 B2
(45) Date of Patent: May 16, 2023

(54) POLYETHYLENE BLENDS AND FILMS

(71) Applicant: ExxonMobil Chemical Patents Inc., Baytown, TX (US)

(72) Inventors: Ching-Tai Lue, Sugar Land, TX (US); Dongming Li, Houston, TX (US); Hasnain Rangwalla, Katy, TX (US); Matthew F. Yott, Dayton, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/309,173

(22) PCT Filed: Nov. 13, 2019

(86) PCT No.: PCT/US2019/061218
§ 371 (c)(1),
(2) Date: May 3, 2021

(87) PCT Pub. No.: WO2020/102380
PCT Pub. Date: May 22, 2020

(65) Prior Publication Data
US 2022/0025136 A1    Jan. 27, 2022

Related U.S. Application Data

(60) Provisional application No. 62/760,292, filed on Nov. 13, 2018.

(51) Int. Cl.
*C08J 5/18*        (2006.01)
*C08L 23/08*       (2006.01)
*B29C 48/00*       (2019.01)

(52) U.S. Cl.
CPC .............. *C08J 5/18* (2013.01); *C08L 23/0815* (2013.01); *B29C 48/0018* (2019.02); *C08J 2323/08* (2013.01); *C08L 2203/162* (2013.01); *C08L 2205/025* (2013.01); *C08L 2205/035* (2013.01)

(58) Field of Classification Search
CPC ..... C08J 5/18; C08J 2323/08; C08L 23/0815; C08L 2203/162; C08L 2205/025; C08L 2205/035; B29C 48/0018
See application file for complete search history.

(56) References Cited

U.S. PATENT DOCUMENTS

| 4,429,079 A * | 1/1984 | Shibata | ............... C08L 23/0815 525/240 |
| 6,359,072 B1 * | 3/2002 | Whaley | ................. C08L 23/142 525/240 |
| 2005/0261471 A1 * | 11/2005 | Mutchler | .............. C08F 210/16 528/480 |
| 2007/0260016 A1 * | 11/2007 | Best | ........................ C08L 23/04 525/240 |

(Continued)

FOREIGN PATENT DOCUMENTS

| WO | 1998-021274 | 5/1998 | |
| WO | WO-9821274 A1 * | 5/1998 | ........... B29C 48/022 |
| WO | 1999-055775 | 11/1999 | |

*Primary Examiner* — Travis M Figg
(74) *Attorney, Agent, or Firm* — ExxonMobil Chemical Patents Inc.—Law Department

(57) ABSTRACT

Provided herein are polyethylene films made of the polyethylene blends having improved properties, particularly in Elmendorf tear and puncture resistance. The polyethylene blends include two primary polyethylene blends.

19 Claims, 7 Drawing Sheets

(56) References Cited

U.S. PATENT DOCUMENTS

2016/0060425 A1 3/2016 Falla et al.
2017/0335077 A1 11/2017 Borse et al.
2018/0134018 A1 5/2018 Barreneche

* cited by examiner

POLYETHYLENE BLENDS AND FILMS

CROSS REFERENCE TO RELATED APPLICATIONS

This application is a National Phase Application claiming priority to PCT Application Serial No. PCT/US2019/061224, filed Nov. 13, 2019, which claims the benefit to U.S. Provisional Application Ser. No. 62/760,282, filed Nov. 13, 2018, the disclosures of which are hereby incorporated by reference in their entirety.

FIELD OF THE INVENTION

The present disclosure relates to polyethylene blends, and more particularly relates to films made of such polyethylene blends.

BACKGROUND OF THE INVENTION

When blending two polyethylene compositions having narrow molecular weight distributions or narrow composition distributions, trade-off patterns are often observed amongst various film properties with the variations in molecular weight distribution and/or composition distribution. For instance, certain polyethylene blends are found to be superior in dart impact but inferior in Elmendorf Tear when compared to the primary polyethylene blend or conventional counterpart. Such trade-off paradigm has been one of the major hurdles for the breakthrough of new polyethylene product technology.

A need exists, therefore, for polyethylene blends which overcome this trade-off paradigm and provide improved film properties to produce new products.

SUMMARY OF THE INVENTION

Provided herein are films having an Elmendorf tear in MD greater than or equal to about 360 g/mil and a puncture peak force greater than or equal to about 12.0 lb/mil. Further provided herein are films having an Elmendorf tear in MD greater than or equal to about 360 g/mil and a puncture break energy greater than or equal to about 37.0 in-lb/mil.

Each of the present films comprises a secondary polyethylene blend. The secondary polyethylene blend comprises two primary polyethylene blends. Each primary polyethylene blend has a density between about 0.918 g/cm$^3$ and about 0.922 g/cm$^3$ and an MI (I$_2$) between about 0.90 g/10 min and about 1.10 g/10 min. Each primary polyethylene blend comprises two polyethylene compositions. Each polyethylene composition has a density. In an aspect, the density of each of the polyethylene compositions differs from the other in an amount between about 0.050 g/cm$^3$ and about 0.060 g/cm$^3$.

In an aspect, the secondary polyethylene blend comprises 50 wt % of each primary polyethylene blend.

In an aspect, the primary polyethylene blend comprises the polyethylene composition having a density of about 0.8961 g/cm$^3$ and an MI (I$_2$) of about 0.28 g/10 min in an amount between about 55 wt % and about 57 wt %, and another polyethylene composition having a density of about 0.9510 g/cm$^3$ and an MI (I$_2$) of about 14.2 g/10 min in an amount between about 43 wt % and about 45 wt %.

In an aspect, the primary polyethylene blend comprises the polyethylene composition having a density of about 0.8983 g/cm$^3$ and an MI (I$_2$) of about 7.8 g/10 min in an amount between about 56 wt % and about 58 wt %, and another polyethylene composition having a density of about 0.9516 g/cm$^3$ and an MI (I$_2$) of about 0.20 g/10 min in an amount between about 42 wt % and about 44 wt %.

In an aspect, the primary polyethylene blend comprises the polyethylene composition having density of about 0.9078 g/cm$^3$ and an MI (I$_2$) of about 3.1 g/10 min in an amount between about 52 wt % and about 54 wt %, and another polyethylene composition has a density of about 0.9369 g/cm$^3$ and an MI (I$_2$) of about 0.44 g/10 min in an amount between about 46 wt % and about 48 wt %.

In an aspect, the primary polyethylene blend comprises the polyethylene composition having a density of about 0.9082 g/cm$^3$ and an MI (I$_2$) of about 0.48 g/10 min in an amount between about 56 wt % and about 58 wt %, and another polyethylene composition having a density of about 0.9389 g/cm$^3$ and an MI (I$_2$) of about 3.0 g/10 min in an amount between about 42 wt % and about 44 wt %.

In an aspect, the primary polyethylene blend comprises the polyethylene composition having a density of about 0.8961 g/cm$^3$ and an MI (I$_2$) of about 0.28 g/10 min in an amount between about 39 wt % and about 41 wt %, and another polyethylene composition having a density of about 0.9389 g/cm$^3$ and an MI (I$_2$) of about 3.0 g/10 min in an amount between about 59 wt % and about 61 wt %.

In an aspect, the primary polyethylene blend comprises the polyethylene composition having a density of about 0.8983 g/cm$^3$ and an MI (I$_2$) of about 7.8 g/10 min in an amount between about 38 wt % and about 40 wt %, and another polyethylene composition having a density of about 0.9369 g/cm$^3$ and an MI (I$_2$) of about 0.44 g/10 min in an amount between about 60 wt % and about 62 wt %.

In an aspect, the primary polyethylene blend comprises the polyethylene composition having a density of about 0.9082 g/cm$^3$ and an MI (I$_2$) of about 0.48 g/10 min in an amount between about 70 wt % and about 72 wt %, and another polyethylene composition has a density of about 0.9510 g/cm$^3$ and an MI (I$_2$) of about 14.2 g/10 min in an amount between about 28 wt % and about 30 wt %.

In an aspect, the primary polyethylene blend comprises the polyethylene composition having a density of about 0.9078 g/cm$^3$ and an MI (I$_2$) of about 3.1 g/10 min in an amount between about 69 wt % and about 71 wt %, and the other polyethylene composition has a density of about 0.9516 g/cm$^3$ and an MI (I$_2$) of about 0.20 g/10 min in an amount between about 29 wt % and about 31 wt %.

In an aspect, the secondary polyethylene blend further comprises the polyethylene composition having a density of about 0.918 g/cm$^3$ and an MI (I$_2$) of about 1.0 g/10 min in an amount between about 10 wt % and about 25 wt %.

In an aspect, the polyethylene compositions have an M$_w$/M$_n$ between about 2.5 and about 3.0 and/or the primary polyethylene blends have an M$_w$/M$_n$ between about 2.5 and about 4.0.

In an aspect, the film has a dart drop greater than or equal to about 190 g/mil.

In an aspect, the film has an average gloss between about 45 GU and about 70 GU.

In an aspect, the secondary polyethylene blend comprises two primary polyethylene blends, each primary polyethylene blend having a density between about 0.919 g/cm$^3$ and about 0.922 g/cm$^3$, and an MI (I$_2$) between about 0.93 g/10 min and about 1.09 g/10 min.

Further provided herein are secondary polyethylene blends, each secondary polyethylene blend comprising two primary polyethylene blends in the amount of about 50 wt %. Each primary polyethylene blend comprises two polyethylene compositions.

In an aspect, one of the primary polyethylene blends of the secondary polyethylene blend comprises the polyethylene composition having a density of about 0.8961 g/cm$^3$ and an MI ($I_2$) of about 0.28 g/10 min and in an amount between about 55 wt % and about 57 wt %, and the other polyethylene composition having a density of about 0.9510 g/cm$^3$ and an MI ($I_2$) of about 14.2 g/10 min in an amount between about 43 wt % and about 45 wt %. In this secondary polyethylene blend, the other primary polyethylene blend comprises the polyethylene composition having a density of about 0.8983 g/cm$^3$ and an MI ($I_2$) of about 7.8 g/10 min in an amount between about 56 wt % and about 58 wt %, and another polyethylene composition having a density of about 0.9516 g/cm$^3$ and an MI ($I_2$) of about 0.20 g/10 min in an amount between about 42 wt % and about 44 wt %.

In an aspect, one of the primary polyethylene blends of the secondary polyethylene blend comprises a primary polyethylene blend having two polyethylene compositions where one of the polyethylene compositions has a density of about 0.9078 g/cm$^3$ and an MI ($I_2$) of about 3.1 g/10 min and in an amount between about 52 wt % and about 54 wt %, and the other polyethylene composition has a density of about 0.9369 g/cm$^3$ and an MI ($I_2$) of about 0.44 g/10 min and in an amount between about 46 wt % and about 48 wt %. In this secondary polyethylene blend, the other primary polyethylene blend comprises the polyethylene composition having a density of about 0.9082 g/cm$^3$ and an MI ($I_2$) of about 0.48 g/10 min in an amount between about 56 wt % and about 58 wt %, and another polyethylene composition having a density of about 0.9389 g/cm$^3$ and an MI ($I_2$) of about 3.0 g/10 min in an amount between about 42 wt % and about 44 wt %.

In an aspect, the secondary polyethylene blend has two primary polyethylene blends in the amount of about 50 wt % of each primary polyethylene blend. Each primary polyethylene blend comprises two polyethylene compositions. One of the primary polyethylene blends comprises a polyethylene composition having a density of about 0.8961 g/cm$^3$ and an MI ($I_2$) of about 0.28 g/10 min in an amount between about 39 wt % and about 41 wt % and the other polyethylene composition having a density of about 0.9389 g/cm$^3$ and an MI ($I_2$) of about 3.0 g/10 min in an amount between about 59 wt % and about 61 wt %. The other primary polyethylene blend comprises the polyethylene composition having a density of about 0.8983 g/cm$^3$ and an MI ($I_2$) of about 7.8 g/10 min in an amount between about 38 wt % and about 40 wt %, and another polyethylene composition having a density of about 0.9369 g/cm$^3$ and an MI ($I_2$) of about 0.44 g/10 min in an amount between about 60 wt % and about 62 wt %.

In an aspect, the secondary polyethylene blend comprises two primary polyethylene blends in the amount of about 50 wt % of each primary polyethylene blend. Each primary polyethylene blend comprising two polyethylene compositions. One of the primary polyethylene blends comprises a polyethylene composition having a density of about 0.9082 g/cm$^3$ and an MI ($I_2$) of about 0.48 g/10 min in an amount between about 70 wt % and about 72 wt %, and the other polyethylene composition has a density of about 0.9510 g/cm$^3$ and an MI ($I_2$) of about 14.2 g/10 min in an amount between about 28 wt % and about 30 wt %. The other primary polyethylene blend of this secondary polyethylene blend comprises the polyethylene composition having a density of about 0.9078 g/cm$^3$ and an MI ($I_2$) of about 3.1 g/10 min in an amount between about 69 wt % and about 71 wt %, and the other polyethylene composition has a density of about 0.9516 g/cm$^3$ and an MI ($I_2$) of about 0.20 g/10 min in an amount between about 29 wt % and about 31 wt %.

In an aspect, the secondary polyethylene blend comprising two primary polyethylene blends in the amount of about 40 wt % of each primary polyethylene blend. Each primary polyethylene blend comprises two polyethylene compositions, where one of the primary polyethylene blends comprises a polyethylene composition having a density of about 0.9078 g/cm$^3$ and an MI ($I_2$) of about 3.1 g/10 min in an amount between about 52 wt % and about 54 wt %, and the other polyethylene composition has a density of about 0.9369 g/cm$^3$ and an MI ($I_2$) of about 0.44 g/10 min in an amount between about 46 wt % and about 48 wt %. The other primary polyethylene blend comprises the polyethylene composition having a density of about 0.9082 g/cm$^3$ and an MI ($I_2$) of about 0.48 g/10 min in an amount between about 56 wt % and about 58 wt %, and the other polyethylene composition having a density of about 0.9389 g/cm$^3$ and an MI ($I_2$) of about 3.0 g/10 min in an amount between about 42 wt % and about 44 wt %. This secondary polyethylene blend further comprises the polyethylene composition having a density of about 0.918 g/cm$^3$ and an MI ($I_2$) of about 1.0 g/10 min in an amount between about 20 wt %.

In an aspect, secondary polyethylene blends described herein can comprise the primary polyethylene blends in an amount of about 22.0 wt % of each primary polyethylene blend, and a polyethylene composition having a density of about 0.918 g/cm$^3$ and an MI ($I_2$) of about 1.0 g/10 min in an amount between about 20 wt % in an amount of about 12.0 wt %

The present films can comprise any one of the secondary polyethylene blends described herein.

DESCRIPTION OF THE PREFERRED EMBODIMENTS

Figure 1:
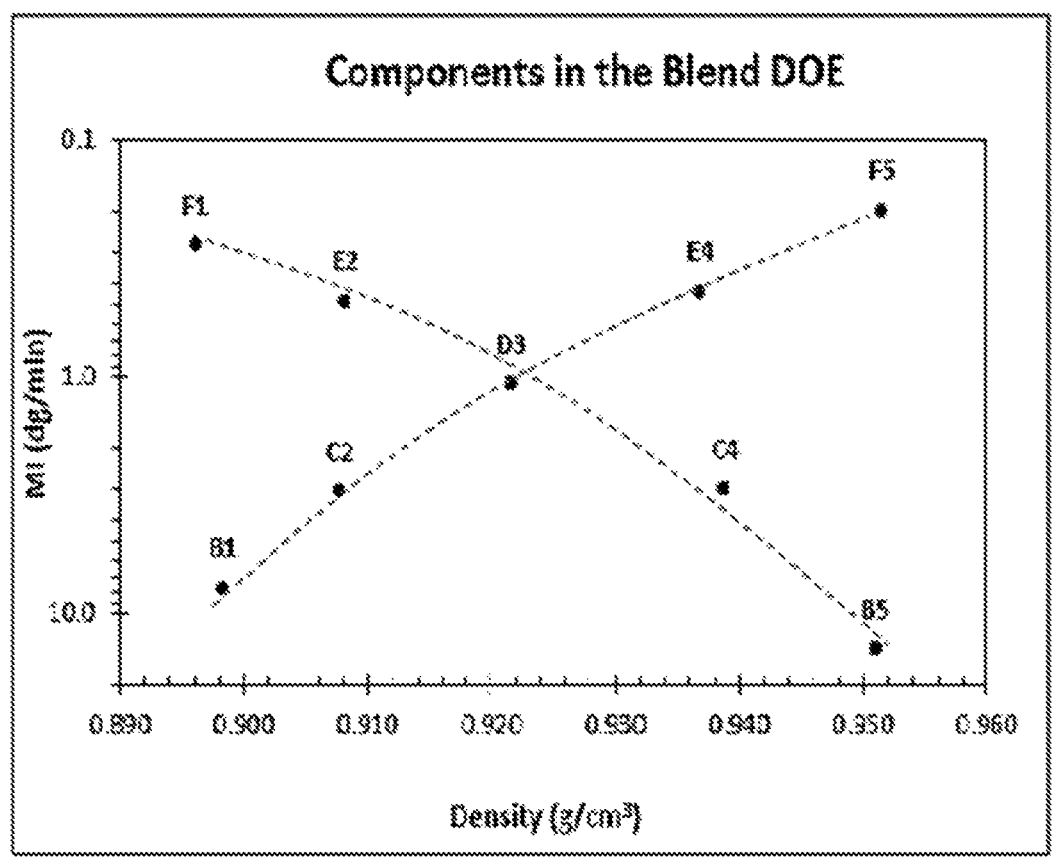
FIG. 1 shows the polyethylene compositions used as blending components to produce the primary polyethylene blends and the secondary polyethylene blends described herein, or those compositions used as a control.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

The term "alpha-olefin" refers to an olefin having a terminal carbon-to-carbon double bond in the structure thereof $(R^1R^2)$—C=CH$_2$, where $R^1$ and $R^2$ can be independently hydrogen or any hydrocarbyl group. In an aspect, R' is hydrogen, and $R^2$ is an alkyl group. A "linear alpha-olefin" is an alpha-olefin as defined in this paragraph wherein R' is hydrogen, and $R^2$ is hydrogen or a linear alkyl group.

The term "average," when used to describe a physical property measured in multiple directions, means the average value of the property in each direction. For example, secant modulus can be measured by straining an object in the machine direction (MD) or in the transverse direction (TD). For example, the "average MD/TD 1% secant modulus" or "average 1% secant modulus" refers to the average of the MD secant modulus and the TD secant modulus at 1% strain.

The term "broad orthogonal comonomer distribution" ("BOCD") is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

A "catalyst system" as used herein may include one or more polymerization catalysts, activators, supports/carriers, or any combination thereof.

The terms "catalyst system" and "catalyst" are used interchangeably herein.

The term "composition distribution breadth index" ("CDBI") refers to the weight percent of the copolymer molecules having a comonomer content within 50% of the median total molar comonomer content. The CDBI of any copolymer is determined utilizing known techniques for isolating individual fractions of a sample of the copolymer. Exemplary is Temperature Rising Elution Fraction ("TREF") described in Wild, et al., J. Poly. Sci., Poly. Phys. Ed., Vol. 20, pg. 441 (1982) and U.S. Pat. No. 5,008,204.

As used herein, the term "copolymer" refers to polymers having more than one type of monomer, including interpolymers, terpolymers, or higher order polymers.

The term "$C_n$ group" or "$C_n$ compound" refers to a group or a compound with total number carbon atoms "n." Thus, a $C_m$-$C_n$ group or compound refers to a group or a compound having total number of carbon atoms in a range from m to n. For example, a $C_1$-$C_{50}$ alkyl group refers to an alkyl compound having 1 to 50 carbon atoms.

As used herein, the terms "cyclopentadiene" and "cyclopentadienyl" are abbreviated as "Cp."

All numerical values within the detailed description and the claims herein are modified by "about" or "approximately" the indicated value, taking into account experimental error and variations.

Unless otherwise specified, the term "density" refers to the density of the polyethylene composition or polyethylene blend independent of any additives, such as antiblocks, which may change the tested value.

As used herein, in reference to Periodic Table Groups of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the term "heat seal initiation temperature" means the temperature at which a heat seal forms immediately after the sealing operation, the strength of the heat seal being measured at a specified time interval (milliseconds) after completion of the sealing cycle and after the seal has cooled to ambient temperature and reached maximum strength. The strength of the seal is often specified—for example, the "heat seal initiation temperature at 5 N" refers to the temperature at which a seal is formed that will have a strength of 5 N after cooling. Heat seal initiation temperature can be measured by ASTM F1921.

As used herein, the term "hot tack seal initiation temperature" means the temperature at which a heat seal forms immediately after the sealing operation, the strength of the heat seal being measured at a specified time interval (milliseconds) after completion of the sealing cycle and before the seal has cooled to ambient temperature and reached maximum strength. The strength of the seal is often specified—for example, the "heat seal initiation temperature at 1 N" refers to the temperature at which a hot 1 N seal is formed. Hot tack seal initiation temperature can be measured by ASTM F1921.

The term "hot tack" refers to the peel force of a sealing area when it is not completely cooled down. The term "heat seal strength" refers to the peel force when the sealing area is completely cooled down. Hot tack force and heat seal strength of the same material are typically different from each other.

As used herein, the term "linear low density polyethylene" ("LLDPE") means polyethylene having a significant number of short branches. LLDPEs can be distinguished structurally from conventional LDPEs because LLDPEs typically have minimal long chain branching and more short chain branching than LDPEs.

The term "metallocene catalyzed linear low density polyethylene" ("mLLDPE") refers to an LLDPE composition produced with a metallocene catalyst.

The term "linear medium density polyethylene" ("MDPE") refers to a polyethylene having a density from about 0.930 g/cm$^3$ to about 0.950 g/cm$^3$.

As used herein, the term "metallocene catalyst" refers to a catalyst having at least one transition metal compound containing one or more substituted or unsubstituted Cp moiety (typically two Cp moieties) in combination with a Group 4, 5, or 6 transition metal. A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "melt index" ("MI") is the number of grams extruded in 10 minutes under the action of a standard load and is an inverse measure of viscosity. A high MI implies low viscosity and a low MI implies high viscosity. In addition, polymers are shear thinning, which means that their resistance to flow decreases as the shear rate increases. This is due to molecular alignments in the direction of flow and disentanglements.

As provided herein, MI ($I_2$) is determined according to ASTM D-1238-E (190° C./2.16 kg), also sometimes referred to as $I_2$ or $I_{2.16}$.

As provided herein, MI ($I_{21}$) is determined according to ASTM D-1238-E (190° C./21.6 kg), also sometimes referred to as 121 or $I_{21.6}$.

The "melt index ratio" ("MIR") provides an indication of the amount of shear thinning behavior of the polymer and is a parameter that can be correlated to the overall polymer mixture molecular weight distribution data obtained separately by using Gel Permeation Chromatography ("GPC") and possibly in combination with another polymer analysis including TREF. MIR is the ratio of $I_{21}/I_2$.

The term "melt strength" is a measure of the extensional viscosity and is representative of the maximum tension that can be applied to the melt without breaking. Extensional viscosity is the polyethylene composition's ability to resist thinning at high draw rates and high draw ratios. In melt processing of polyolefins, the melt strength is defined by two key characteristics that can be quantified in process-related terms and in rheological terms. In extrusion blow molding and melt phase thermoforming, a branched polyolefin of the appropriate molecular weight can support the weight of the fully melted sheet or extruded portion prior to the forming stage. This behavior is sometimes referred to as sag resistance.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of g·mol$^{-1}$.

As used herein, unless specified otherwise, percent by mole is expressed as "mole %," and percent by weight is expressed as "wt %."

Molecular weight distribution ("MWD") is a measure of the spread of a polymer's molecular weight. A given polymer sample comprises molecules of varying chain length, and thus molecular weight, so the molecular weight of a polymer is represented as a distribution rather than as a single value. MWD is typically characterized as "broad" or "narrow." MWD is equivalent to the expression $M_w/M_n$ and is also referred to as polydispersity index ("PDI"). The expression $M_w/M_n$ is the ratio of $M_w$ to $M_n$. $M_w$ is given by $$M_w = \frac{\sum_i n_i M_i^2}{\sum_i n_i M_i}$$

$M_n$ is given by $$M_n = \frac{\sum_i n_i M_i}{\sum_i n_i}$$

$M_z$ is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are about 1.463 g/ml at about 21° C. and about 1.284 g/ml at about 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the refractive index increment for the system. The refractive index, n=1.500 for TCB at 145° C. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, A2 is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and $\lambda$=657 nm. A high temperature Viscotek Corporation viscometer, which has four capillaries arranged in a Wheatstone bridge configuration with two pressure transducers, can be used to determine specific viscosity. One transducer measures the total pressure drop across the detector, and the other, positioned between the two sides of the bridge, measures a differential pressure. The specific viscosity, $r_{is}$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. The average intrinsic viscosity, $[\eta]_{avg}$ of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'vis = \frac{[\eta]_{avg}}{kM_v^\alpha}.$$

$M_v$ is the viscosity-average molecular weight based on molecular weights determined by LS analysis. Z average branching index ($g'z_{ave}$) is calculated using Ci=polymer concentration in the slice i in the polymer peak times the mass of the slice squared, Mi². All molecular weights are weight average unless otherwise noted. All molecular weights are reported in g/mol unless otherwise noted. This method is the preferred method of measurement and used in the examples and throughout the disclosures unless otherwise specified. See also, Macromolecules, Vol. 34, No. 19, *Effect of Short Chain Branching on the Coil Dimensions of Polyolefins in Dilute Solution*, Sun et al., pg. 6812-6820 (2001).

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term olefin includes all structural isomeric forms of olefins, unless it is specified to mean a single isomer or the context clearly indicates otherwise.

As used herein, the term "polymer" refers to a compound having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used herein, the term "comonomer" refers to the unique mer units in a copolymer. Since comonomers in a copolymer have non-identical MWDs, the composition of the copolymer varies at different molecular weights. As with MWD, comonomer composition must be represented as a distribution rather than as a single value. The term "composition distribution," or "comonomer distribution," is a measure of the spread of a copolymer's comonomer composition. Composition distribution is typically characterized as "broad" or "narrow."

As used herein, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A copolymer can be terpolymers and the like.

As used herein, the terms "polymerization temperature" and "reactor temperature" are interchangeable.

The term "substantially uniform comonomer distribution" is used herein to mean that comonomer content of the polymer fractions across the molecular weight range of the ethylene-based polymer vary by <10.0 wt %. In an aspect, a substantially uniform comonomer distribution refers to <8.0 wt %, <5.0 wt %, or <2.0 wt %.

As used herein, the term "supported" refers to one or more compounds that are deposited on, contacted with, vaporized with, bonded to, incorporated within, adsorbed or absorbed in, or on, a support or carrier. The terms "support" and "carrier" can be used interchangeably and include any support material including, but not limited to, a porous support material or inorganic or organic support materials. Non-limiting examples of inorganic support materials include inorganic oxides and inorganic chlorides. Other carriers include resinous support materials such as polystyrene, functionalized or cross-linked organic supports, such as polystyrene, divinyl benzene, polyolefins, or polymeric compounds, zeolites, talc, clays, or any other organic or inorganic support material and the like, or mixtures thereof.

In an extrusion process, "viscosity" is a measure of resistance to shearing flow. Shearing is the motion of a fluid, layer-by-layer, like a deck of cards. When polymers flow through straight tubes or channels, the polymers are sheared and resistance is expressed in terms of viscosity.

"Extensional" or "elongational viscosity" is the resistance to stretching. In fiber spinning, film blowing and other processes where molten polymers are stretched, the elongational viscosity plays a role. For example, for certain liquids, the resistance to stretching can be three times larger than in shearing. For some polymeric liquids, the elongational viscosity can increase (tension stiffening) with the rate, although the shear viscosity decreased.

Various film property measurements described herein may be based on certain standardized testing procedures. For example, measurements of tensile strength in the machine direction ("MD") and transverse direction ("TD") can be made using the standard test method of ASTM D882. Measurements of yield strength in MD and TD can be made using the standard test method of ASTM D882. Measurements of Elmendorf tear in MD can be made using the standard test method of ASTM D1922 and/or ASTM 1424. Measurements for 1% secant modulus can be made using the standard test method of ASTM D790A. Measurements for puncture peak force and puncture break energy can be measured using the standard test method of ASTM F1306. Measurements of dart-drop (sometimes referred to herein as "dart impact") can be made using the standard test method of ASTM D1709 and/or the protocol of ISO 7765. Gloss can be measured using the procedure of ASTM D523. Light transmission percent (or haze) measurements can be made using the procedure of ASTM D1003 using a haze meter Haze-Guard Plus AT-4725 from BYK Gardner and defined as the percentage of transmitted light passing through the bulk of the film sample that is deflected by more than 2.5°.

The "secant modulus" is the slope of a line connecting the origin to an object's stress/strain curve at a specified strain percentage. For example, the "1% secant modulus" is the slope of a line connecting the origin to an object's stress/strain curve at 1% strain. The secant modulus describes the overall stiffness of an object. Lower strain percentages typically approximate elastic behavior more accurately. Measurements for 1% secant modulus can be made by following the procedure of ASTM D790A.

The term "tensile strength" refers to the stretching force required to inelastically deform a material. The tensile strength of a material can be measured by stretching the material in MD or TD. The "average MD/TD tensile strength" thus refers to the average of the MD tensile strength and the TD tensile strength. Tensile strength can be measured in psi and as set out in the standard test methods of ASTM D638 or ASTM D882.

Provided herein are films made of secondary polyethylene blends comprising two primary polyethylene blends. Films made of the secondary polyethylene blends have been found to overcome the trade-off paradigm (referred to above) as several observed synergistic effects have resulted in the novel combinations of desirable film properties and features. Generally, the primary polyethylene blends were each targeted to have about 1.0 melt index ("MI") and a density of 0.920 g/cm³. More specifically, the primary polyethylene blends can have a density between about 0.918 g/cm³ and about 0.922 g/cm³ and an MI ($I_2$) between about 0.90 g/10 min and about 1.10 g/10 min. As described herein, each primary polyethylene blend comprises two polyethylene compositions, each polyethylene composition having a density. The difference in the density of the polyethylene compositions (sometimes referred to as the "density spread") can be between about 0.050 g/cm³ and about 0.060 g/cm³ or in an aspect, about 0.055 g/cm³.

As provided in the examples, a series of secondary polyethylene blends were blended for blow film evaluation and compared with the primary polyethylene blend. The secondary polyethylene blends were found in general to show synergistic effects in Puncture, Gloss and MD-Tear over the primary polyethylene blend. At the same time, the secondary polyethylene blends typically maintained stiffness and sealing advantage of the primary polyethylene blend. In short, the trade-off paradigm among various performance attributes has been one of the major hurdles in development of new film product applications and technologies. With the so-called secondary blend approach described herein, such trade-off paradigm was effectively removed, leading to unprecedented combinations of desirable features.

For example, the present films made from the secondary polyethylene blends described herein can have an Elmendorf tear in MD greater than or equal to about 360 g/mil and a puncture peak force greater than or equal to about 12.0 lb/mil. In an aspect, the films have an Elmendorf tear in MD greater than or equal to about 360 g/mil and a puncture break energy greater than or equal to about 37.0 in-lb/mil. In addition, the present films can have a heat seal initiation temperature at 5 N less than or equal to about 100° C. Furthermore, these films can have a hot tack seal initiation temperature at 1 N less than or equal to about 100° C. and can have a dart drop greater than or equal to about 190 g/mil. The subject films were shown to have an average gloss between about 45 GU and about 70 GU. The present films also have an average 1% secant modulus greater than or equal to about 30,000 psi and an average yield strength greater than or equal to about 1340 psi. As described herein, the present films can have an average tensile strength greater than or equal to about 7490 psi.

As described in the examples, the secondary polyethylene blends comprise two primary polyethylene blends, each primary polyethylene blend comprising two polyethylene compositions.

In an aspect, the primary polyethylene blend comprises the polyethylene composition having a density of about 0.8961 g/cm³ and an MI ($I_2$) of about 0.28 g/10 min in an amount between about 55 wt % and about 57 wt %, and another polyethylene composition having a density of about 0.9510 g/cm³ and an MI ($I_2$) of about 14.2 g/10 min in an amount between about 43 wt % and about 45 wt %.

In an aspect, the primary polyethylene blend comprises the polyethylene composition having a density of about 0.8983 g/cm³ and an MI ($I_2$) of about 7.8 g/10 min in an amount between about 56 wt % and about 58 wt %, and another polyethylene composition having a density of about 0.9516 g/cm³ and an MI ($I_2$) of about 0.20 g/10 min in an amount between about 42 wt % and about 44 wt %.

In an aspect, the primary polyethylene blend comprises the polyethylene composition having density of about 0.9078 g/cm³ and an MI ($I_2$) of about 3.1 g/10 min in an amount between about 52 wt % and about 54 wt %, and another polyethylene composition has a density of about 0.9369 g/cm³ and an MI ($I_2$) of about 0.44 g/10 min in an amount between about 46 wt % and about 48 wt %.

In an aspect, the primary polyethylene blend comprises the polyethylene composition having a density of about 0.9082 g/cm³ and an MI ($I_2$) of about 0.48 g/10 min in an amount between about 56 wt % and about 58 wt %, and another polyethylene composition having a density of about 0.9389 g/cm$^3$ and an MI (I$_2$) of about 3.0 g/10 min in an amount between about 42 wt % and about 44 wt %.

In an aspect, the primary polyethylene blend comprises the polyethylene composition having a density of about 0.8961 g/cm$^3$ and an MI (I$_2$) of about 0.28 g/10 min in an amount between about 39 wt % and about 41 wt %, and another polyethylene composition having a density of about 0.9389 g/cm$^3$ and an MI (I$_2$) of about 3.0 g/10 min in an amount between about 59 wt % and about 61 wt %.

In an aspect, the primary polyethylene blend comprises the polyethylene composition having a density of about 0.8983 g/cm$^3$ and an MI (I$_2$) of about 7.8 g/10 min in an amount between about 38 wt % and about 40 wt %, and another polyethylene composition having a density of about 0.9369 g/cm$^3$ and an MI (I$_2$) of about 0.44 g/10 min in an amount between about 60 wt % and about 62 wt %.

In an aspect, the primary polyethylene blend comprises the polyethylene composition having a density of about 0.9082 g/cm$^3$ and an MI (I$_2$) of about 0.48 g/10 min in an amount between about 70 wt % and about 72 wt %, and another polyethylene composition has a density of about 0.9510 g/cm$^3$ and an MI (I$_2$) of about 14.2 g/10 min in an amount between about 28 wt % and about 30 wt %.

In an aspect, in the primary polyethylene blend comprises the polyethylene composition having a density of about 0.9078 g/cm$^3$ and an MI (I$_2$) of about 3.1 g/10 min in an amount between about 69 wt % and about 71 wt %, and the other polyethylene composition has a density of about 0.9516 g/cm$^3$ and an MI (I$_2$) of about 0.20 g/10 min in an amount between about 29 wt % and about 31 wt %.

In an aspect, the polyethylene compositions have an M$_w$/M$_n$ between about 2.5 and about 3.0 and/or the primary polyethylene blends have an M$_w$/M$_n$ between about 2.5 and about 4.0.

The secondary polyethylene blend can comprise two primary polyethylene blends in the amount of about 50 wt % of each primary polyethylene blend. For example, the secondary polyethylene blend can comprise the primary polyethylene blend comprising the polyethylene composition having a density of about 0.8961 g/cm$^3$ and an MI (I$_2$) of about 0.28 g/10 min in an amount between about 55 wt % and about 57 wt %, and another polyethylene composition having a density of about 0.9510 g/cm$^3$ and an MI (I$_2$) of about 14.2 g/10 min in an amount between about 43 wt % and about 45 wt %. The other primary polyethylene blend of this secondary polyethylene blend comprises the polyethylene composition having a density of about 0.8983 g/cm$^3$ and an MI (I$_2$) of about 7.8 g/10 min in an amount between about 56 wt % and about 58 wt %, and another polyethylene composition having a density of about 0.9516 g/cm$^3$ and an MI (I$_2$) of about 0.20 g/10 min in an amount between about 42 wt % and about 44 wt %.

Likewise, the secondary polyethylene blend can comprise the primary polyethylene comprising the polyethylene composition having density of about 0.9078 g/cm$^3$ and an MI (I$_2$) of about 3.1 g/10 min in an amount between about 52 wt % and about 54 wt %, and another polyethylene composition has a density of about 0.9369 g/cm$^3$ and an MI (I$_2$) of about 0.44 g/10 min in an amount between about 46 wt % and about 48 wt %. The other primary polyethylene blend of this secondary polyethylene blend comprises the polyethylene composition having a density of about 0.9082 g/cm$^3$ and an MI (I$_2$) of about 0.48 g/10 min in an amount between about 56 wt % and about 58 wt %, and another polyethylene composition having a density of about 0.9389 g/cm$^3$ and an MI (I$_2$) of about 3.0 g/10 min in an amount between about 42 wt % and about 44 wt %.

The secondary polyethylene blend can comprise the primary polyethylene blend having the polyethylene composition with a density of about 0.8961 g/cm$^3$ and an MI (I$_2$) of about 0.28 g/10 min in an amount between about 39 wt % and about 41 wt %, and another polyethylene composition having a density of about 0.9389 g/cm$^3$ and an MI (I$_2$) of about 3.0 g/10 min in an amount between about 59 wt % and about 61 wt %. The other primary polyethylene blend of this secondary polyethylene blend can comprise the polyethylene composition having a density of about 0.8983 g/cm$^3$ and an MI (I$_2$) of about 7.8 g/10 min in an amount between about 38 wt % and about 40 wt %, and another polyethylene composition having a density of about 0.9369 g/cm$^3$ and an MI (I$_2$) of about 0.44 g/10 min in an amount between about 60 wt % and about 62 wt %.

In an aspect, the secondary polyethylene blend can comprise the primary polyethylene blend comprising the polyethylene composition having a density of about 0.9082 g/cm$^3$ and an MI (I$_2$) of about 0.48 g/10 min in an amount between about 70 wt % and about 72 wt %, and another polyethylene composition has a density of about 0.9510 g/cm$^3$ and an MI (I$_2$) of about 14.2 g/10 min in an amount between about 28 wt % and about 30 wt %. The other primary polyethylene blend comprises the polyethylene composition having a density of about 0.9078 g/cm$^3$ and an MI (I$_2$) of about 3.1 g/10 min in an amount between about 69 wt % and about 71 wt %, and the other polyethylene composition has a density of about 0.9516 g/cm$^3$ and an MI (I$_2$) of about 0.20 g/10 min in an amount between about 29 wt % and about 31 wt %.

In aspect, the secondary polyethylene blend can comprise two primary polyethylene blends in the amount of about 40 wt % of each primary polyethylene blend. Here, the secondary polyethylene blend can further comprise yet another polyethylene composition having a density of about 0.918 g/cm$^3$ and an MI (I$_2$) of about 1.0 g/10 min in an amount about 20 wt %.

For example, the secondary polyethylene blend can comprise two primary polyethylene blends in the amount of about 40 wt % of each primary polyethylene blend where one of the primary polyethylene blends comprises the polyethylene composition having a density of about 0.8961 g/cm$^3$ and an MI (I$_2$) of about 0.28 g/10 min in an amount between about 55 wt % and about 57 wt %, and another polyethylene composition having a density of about 0.9510 g/cm$^3$ and an MI (I$_2$) of about 14.2 g/10 min in an amount between about 43 wt % and about 45 wt %. The other primary polyethylene blend of this secondary polyethylene blend comprises the polyethylene composition having a density of about 0.8983 g/cm$^3$ and an MI (I$_2$) of about 7.8 g/10 min in an amount between about 56 wt % and about 58 wt %, and another polyethylene composition having a density of about 0.9516 g/cm$^3$ and an MI (I$_2$) of about 0.20 g/10 min in an amount between about 42 wt % and about 44 wt %. The secondary polyethylene blend further comprises another polyethylene composition having a density of about 0.918 g/cm$^3$ and an MI (I$_2$) of about 1.0 g/10 min in an amount about 20 wt %.

In aspect, the secondary polyethylene blend comprises two primary polyethylene blends in the amount of about 40 wt % of each primary polyethylene blend and further comprises another polyethylene composition having a density of about 0.918 g/cm$^3$ and an MI (I$_2$) of about 1.0 g/10 min in an amount about 20 wt %. Here, one of the primary polyethylene blends comprises the polyethylene composition having a density of about of about 0.9078 g/cm$^3$ and an MI (I$_2$) of about 3.1 g/10 min in an amount between about 52 wt % and about 54 wt %, and another polyethylene composition has a density of about 0.9369 g/cm$^3$ and an MI (I$_2$) of about 0.44 g/10 min in an amount between about 46 wt % and about 48 wt %. The other primary polyethylene blend of this secondary polyethylene blend comprises the polyethylene composition having a density of about 0.9082 g/cm$^3$ and an MI (I$_2$) of about 0.48 g/10 min in an amount between about 56 wt % and about 58 wt %, and another polyethylene composition having a density of about 0.9389 g/cm$^3$ and an MI (I$_2$) of about 3.0 g/10 min in an amount between about 42 wt % and about 44 wt %.

Additional secondary polyethylene compositions used to produce the present films can have various components (primary polyethylene blends and polyethylene compositions) in various amounts (wt %) are described herein and, particularly, in the examples below.

Polyethylene Compositions

As described herein, the present polyethylene compositions comprise from about 50.0 mol % to about 100.0 mol % of units derived from ethylene. The lower limit on the range of ethylene content can be from 50.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene composition can have an upper limit on the range of ethylene content of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on mole % of polymer units derived from ethylene.

Further provided herein are polyethylene compositions produced by polymerization of ethylene and, optionally, an alpha-olefin comonomer having from 3 to 10 carbon atoms. Alpha-olefin comonomers are selected from monomers having 3 to 10 carbon atoms, such as C$_3$-C$_{10}$ alpha-olefins. Comonomers can be linear or branched or may include two unsaturated carbon-carbon bonds, i.e., dienes. Examples of suitable comonomers include linear C$_3$-C$_{10}$ alpha-olefins and alpha-olefins having one or more C$_1$-C$_3$ alkyl branches or an aryl group. Comonomer examples include propylene, 1-butene, 3-methyl-1-butene, 3,3-dimethyl-1-butene, 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, ethyl, methyl, or dimethyl-substituted 1-decene, 1-dodecene, and styrene.

Exemplary combinations of ethylene and comonomers include: ethylene 1-butene, ethylene 1-pentene, ethylene 4-methyl-1-pentene, ethylene 1-hexene, ethylene 1-octene, ethylene decene, ethylene dodecene, ethylene 1-butene 1-hexene, ethylene 1-butene 1-pentene, ethylene 1-butene 4-methyl-1-pentene, ethylene 1-butene 1-octene, ethylene 1-hexene 1-pentene, ethylene 1-hexene 4-methyl-1-pentene, ethylene 1-hexene 1-octene, ethylene 1-hexene decene, ethylene 1-hexene dodecene, ethylene propylene 1-octene, ethylene 1-octene 1-butene, ethylene 1-octene 1-pentene, ethylene 1-octene 4-methyl-1-pentene, ethylene 1-octene 1-hexene, ethylene 1-octene decene, ethylene 1-octene dodecene, and combinations thereof. It should be appreciated that the foregoing list of comonomers and comonomer combinations are merely exemplary and are not intended to be limiting. Often, the comonomer is 1-butene, 1-hexene, or 1-octene.

During copolymerization, monomer feeds are regulated to provide a ratio of ethylene to comonomer, e.g., alpha-olefin, so as to yield a polyethylene having a comonomer content, as a bulk measurement, of from about 0.1 mol % to about 20 mol % comonomer. In other aspects the comonomer content is from about 0.1 mol % to about 4.0 mol %, or from about 0.1 mol % to about 3.0 mol %, or from about 0.1 mol % to about 2.0 mol %, or from about 0.5 mol % to about 5.0 mol %, or from about 1.0 mol % to about 5.0 mol %. The reaction temperature, monomer residence time, catalyst system component quantities, and molecular weight control agent (such as H$_2$) may be regulated so as to provide the polyethylene compositions. For linear polyethylenes, the amount of comonomers, comonomer distribution along the polymer backbone, and comonomer branch length will generally delineate the density range.

Comonomer content is based on the total content of all monomers in the polymer. The polyethylene copolymer has minimal long chain branching (i.e., less than 1.0 long-chain branch/1000 carbon atoms, particularly 0.05 to 0.50 long-chain branch/1000 carbon atoms). Such values are characteristic of a linear structure that is consistent with a branching index (as defined below) of g'$_{vis}$≥0.980, 0.985, ≥0.99, ≥0.995, or 1.0. While such values are indicative of little to no long chain branching, some long chain branches can be present (i.e., less than 1.0 long-chain branch/1000 carbon atoms, or less than 0.5 long-chain branch/1000 carbon atoms, particularly 0.05 to 0.50 long-chain branch/1000 carbon atoms).

In an aspect, the present polyethylene compositions can include ethylene-based polymers which include LLDPE produced by gas-phase polymerization of ethylene and, optionally, an alpha-olefin with a catalyst having as a transition metal component a bis(n-C$_{34}$ alkyl cyclopentadienyl) hafnium compound, wherein the transition metal component comprises from about 95 to about 99 mol % of the hafnium compound.

Generally, polyethylene can be polymerized in any catalytic polymerization process, including solution phase processes, gas phase processes, slurry phase processes, and combinations of such processes. An exemplary process used to polymerize ethylene-based polymers, such as LLDPEs, is as described in U.S. Pat. Nos. 6,936,675 and 6,528,597.

The above-described processes can be tailored to achieve desired polyethylene compositions. For example, comonomer to ethylene concentration or flow rate ratios are commonly used to control composition density. Similarly, hydrogen to ethylene concentrations or flow rate ratios are commonly used to control composition molecular weight.

Polyethylene compositions provided herein can be blended with LLDPE and other polymers, such as additional polymers prepared from ethylene monomers. Exemplary additional polymers are LLDPE, non-linear LDPE, very low density polyethylene ("VLDPE"), MDPE, high density polyethylene ("HDPE"), differentiated polyethylene ("DPE"), and combinations thereof. DPE copolymers include EVA, EEA, EMA, EBA, and other specialty copolymers. The additional polymers contemplated in certain aspects include ethylene homopolymers and/or ethylene-olefin copolymers. The product of blending one or more polyethylene compositions with other polymers is referred to as a polyethylene blend.

Polyethylene compositions can be composed of blended polymers include at least 0.1 wt % and up to 99.9 wt % of LLDPE, and at least 0.1 wt % and up to 99.9 wt % of one or more additional polymers, with these wt % based on the total weight of the polyethylene composition. Alternative lower limits of LLDPE can be 5%, 10%, 20%, 30%, 40%, or 50% by weight. Alternative upper limits of LLDPE can be 95%, 90%, 80%, 70%, 60%, and 50% by weight. Ranges from any lower limit to any upper limit are within the scope of the invention. Preferred blends include more than about 90% LLDPE, and preferably more than about 95% LLDPE. In an aspect, the blends include from 5-85%, alternatively from 10-50% or from 10-30% by weight of LLDPE. The balance of the weight percentage is the weight of the additional and/or other type of polymers, e.g., different LLDPE, LDPE, VLDPE, MDPE, HDPE, DPE such as EVA, EEA, EMA, EBA, and combinations thereof.

The polyethylene compositions can have a density greater than or equal to ("≥") about 0.895 g/cm³, ≥about 0.896 g/cm³, ≥about 0.897 g/cm³, ≥about 0.898 g/cm³, ≥about 0.899 g/cm³, ≥about 0.900 g/cm³, ≥about 0.910 g/cm³, ≥about 0.920 g/cm³, 0.930 g/cm³, ≥about 0.935 g/cm³, ≥about 0.940 g/cm³, ≥about 0.945 g/cm³, ≥about 0.950 g/cm³, ≥about 0.955 g/cm³, and ≥about 0.960 g/cm³. Alternatively, polyethylene compositions can have a density less than or equal to ("≤") about 0.960 g/cm³ about 0.950 g/cm³, e.g., ≤about 0.940 g/cm³, ≤about 0.930 g/cm³, ≤about 0.920 g/cm³, ≤about 0.910 g/cm³, ≤about 0.900 g/cm³ and ≤about 0.890 g/cm³. These ranges include, but are not limited to, ranges formed by combinations any of the above-enumerated values, e.g., from about 0.895 to about 0.960 g/cm³, about 0.900 to about 0.950 g/cm³, about 0.910 about to 0.940 g/cm³, about 0.935 to about 0.950 g/cm³, etc. Density is determined using chips cut from plaques compression molded in accordance with ASTM D-1928-C, aged in accordance with ASTM D-618 Procedure A, and measured as specified by ASTM D-1505.

The polyethylene compositions have an MI according to ASTM D-1238-E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28 g/10 min, or ≥about 0.30 g/10 min.

Also, the polyethylene compositions can have an MI ($I_{2.16}$)≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. The ranges, however, include, but are not limited to, ranges formed by combinations any of the above-enumerated values, for example: from about 0.1 to about 5.0; about 0.2 to about 2.0; and about 0.2 to about 0.5 g/10 min.

The polyethylene compositions can have a melt index ratio ("MIR") that is a dimensionless number and is the ratio of the high load MI to the MI, or $I_{21.6}/I_{2.16}$, as described above. The MIR of the polyethylene compositions described herein is from about 25 to about 80, alternatively, from about 25 to about 70, alternatively, from about 30 to about 55, and alternatively, from about 35 to about 50.

The polyethylene compositions can have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both a substantially uniform and an orthogonal comonomer distribution may be determined using fractionation techniques such as gel permeation chromatography-differential viscometry ("GPC-DV"), temperature rising elution fraction-differential viscometry ("TREF-DV") or cross-fractionation techniques.

In an aspect, the polyethylene composition can have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 5.0° C. to 60.0° C. or 10.0° C. to 60.0° C. A description of the TREF methodology is described in U.S. Pat. No. 8,431,661 B2 and U.S. Pat. No. 6,248,845 B1.

The present polyethylene compositions typically have a broad composition distribution as measured by CDBI or solubility distribution breadth index ("SDBI"). For details of determining the CDBI or SDBI of a copolymer, see, for example, PCT Patent Application WO 93/03093, published Feb. 18, 1993. Polymers produced using a catalyst system described herein have a CDBI less than 50%, or less than 40%, or less than 30%. In an aspect, the polymers have a CDBI of from 20% to less than 50%. In an aspect, the polymers have a CDBI of from 20% to 35%. In an aspect, the polymers have a CDBI of from 25% to 28%.

Polyethylene composition are produced using a catalyst system described herein and have a SDBI greater than 15° C., or greater than 16° C., or greater than 17° C., or greater than 18° C., or greater than 20° C. In an aspect, the polymers have a SDBI of from 18° C. to 22° C. In an aspect, the polymers have a SDBI of from 18.7° C. to 21.4° C. In an aspect, the polymers have a SDBI of from 20° C. to 22° C.

Certain of the present polyethylene compositions are sold under the EXCEED XP® trademark, including metallocene polyethylene compositions ("EXCEED XP® mPE"), which are available from ExxonMobil Chemical Company. EXCEED XP™ mPE compositions offer step-out performance with respect to, for example, dart drop impact strength, flex-crack resistance, and machine direction (MD) tear, as well as maintaining stiffness at lower densities. EXCEED XP™ mPE compositions also offer optimized solutions for a good balance of melt strength, toughness, stiffness, and sealing capabilities which makes this family of polymers well-suited for blown film/sheet solutions.

For example, EXCEED™ 1018 polyethylene composition comprises ethylene 1-hexene copolymers and has a density of about 0.918 g/cm³ and an MI ($I_2$) of about 1.0 g/10 min.

Conventional Catalyst

Conventional catalysts refer to Ziegler Natta catalysts or Phillips-type chromium catalysts. Examples of conventional-type transition metal catalysts are discussed in U.S. Pat. Nos. 4,115,639, 4,077,904 4,482,687, 4,564,605, 4,721, 763, 4,879,359 and 4,960,741. The conventional catalyst compounds that may be used in the processes disclosed herein include transition metal compounds from Groups 3 to 10, or Groups 4 to 6 of the Periodic Table of Elements.

These conventional-type transition metal catalysts may be represented by the formula:

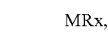

where M is a metal from Groups 3 to 10, or Group 4, or titanium; R is a halogen or a hydrocarbyloxy group; and x is the valence of the metal M. In an aspect, x is 1, 2, 3 or 4, or x is 4. Non-limiting examples of R include alkoxy, phenoxy, bromide, chloride and fluoride. Non-limiting examples of conventional-type transition metal catalysts where M is titanium include TiCl3, TiCl4, TiBr4, Ti(OC2H5)3Cl, Ti(OC2H5)Cl3, Ti(OC4H9)3Cl, Ti(OC3H7)2Cl2, Ti(OC2H5)2Br2, TiCl3.1/3AlCl3 and Ti(OC12H25)Cl3. Conventional chrome catalysts, often referred to as Phillips-type catalysts, may include CrO3, chromocene, silyl chromate, chromyl chloride (CrO2Cl2), chromium-2-ethyl-hexanoate, chromium acetylacetonate (Cr(AcAc)3). Non-limiting examples are disclosed in U.S. Pat. Nos. 2,285,721, 3,242,099 and 3,231,550. For optimization, many conventional-type catalysts require at least one cocatalyst. A detailed discussion of cocatalyst may be found in U.S. Pat. No. 7,858,719, Col. 6, line 46, to Col. 7, line 45.

Metallocene Catalysts

Metallocene catalysts (also referred to herein sometimes as metallocenes or metallocene compounds) are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, the ring(s) or ring system(s), can comprise one or more atoms selected from Groups 13 to 16 atoms of the Periodic Table of Elements; in an aspect, the atoms are selected from the group consisting of carbon, nitrogen, oxygen, silicon, sulfur, phosphorous, germanium, boron and aluminum or a combination thereof. Further, the ring(s) or ring system(s) comprise carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom can be selected from Groups 3 through 15 and the lanthanide or actinide series of the Periodic Table of Elements. The metal is a transition metal from Groups 4 through 12, Groups 4, 5 and 6, and the transition metal is from Group 4.

Exemplary metallocene catalysts and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; EP-A-0 591 756, EP-A-0 520-732, EP-A-0 420 436, EP-B1 0 485 822, EP-B 1 0 485 823, EP-A2-0 743 324, EP-B 1 0 518 092; WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Polymerization Processes

The catalysts described above are suitable for use in any olefin pre-polymerization or polymerization process or both. Suitable polymerization processes include solution, gas phase, slurry phase, and a high-pressure process, or any combination thereof. A desirable process is a gas phase polymerization of one or more olefin monomers having from 2 to 30 carbon atoms, from 2 to 12 carbon atoms in an aspect, and from 2 to 8 carbon atoms in an aspect. Other monomers useful in the process include ethylenically unsaturated monomers, diolefins having 4 to 18 carbon atoms, conjugated or nonconjugated dienes, polyenes, vinyl monomers and cyclic olefins. Non-limiting monomers may also include norbornene, norbornadiene, isobutylene, isoprene, vinylbenzocyclobutane, styrenes, alkyl substituted styrene, ethylidene norbornene, dicyclopentadiene and cyclopentene.

In an aspect, a copolymer of ethylene derived units and one or more monomers or comonomers is produced. The one or more comonomers are an α-olefin having from 4 to 15 carbon atoms in an aspect, from 4 to 12 carbon atoms in an aspect, and from 4 to 8 carbon atoms in an aspect. The comonomer can be 1-hexene.

Hydrogen gas is often used in olefin polymerization to control the final properties of the polyolefin, such as described in Polypropylene Handbook 76-78 (Hanser Publishers, 1996). Increasing concentrations (partial pressures) of hydrogen increase the melt flow rate (MFR) and/or MI of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process is an amount necessary to achieve the desired MFR or MI of the final polyolefin composition. The mole ratio of hydrogen to total monomer ($H_2$:monomer) is in a range of from greater than 0.0001 in an aspect, from greater than 0.0005 in an aspect, from greater than 0.001 in an aspect, to less than 10 in an aspect, less than 5 in an aspect, less than 3 in an aspect, and less than 0.10 in an aspect, wherein a desirable range may comprise any combination of any upper mole ratio limit with any lower mole ratio limit described herein. Expressed another way, the amount of hydrogen in the reactor at any time may range to up to 5000 ppm, up to 4000 ppm in an aspect, up to 3000 ppm in an aspect, between 50 ppm and 5000 ppm in an aspect, and between 100 ppm and 2000 ppm in an aspect.

In a gas phase polymerization process, a continuous cycle is often employed where one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure can vary between 80 and 300 psia, or between 100 and 280 psia, or between 120 and 260 psia, or between 140 and 240 psia. More importantly, a ratio of comonomer to ethylene in the gas phase can vary from 0.0 to 0.10, or between 0.005 and 0.05, or between 0.007 and 0.030, or between 0.01 and 0.02.

Reactor pressure typically varies from 100 psig (690 kPa) to 500 psig (3448 kPa). In an aspect, the reactor pressure is maintained within the range of from 200 psig (1379 kPa) to 500 psig (3448 kPa). In an aspect, the reactor pressure is maintained within the range of from 250 psig (1724 kPa) to 400 psig (2759 kPa).

Production of Blown Film

Blown film extrusion involves the process of extruding the polyethylene blend (also referred to sometimes as a resin) through a die (not shown) followed by a bubble-like expansion. Advantages of manufacturing film in this manner include: (1) a single operation to produce tubing; (2) regulation of film width and thickness by control of the volume of air in the bubble; (3) high extruder output and haul-off speed; (4) elimination of end effects such as edge bead trim and nonuniform temperature that can result from flat die film extrusion; and (5) capability of biaxial orientation (allowing uniformity of mechanical properties).

As part of the process, a melt comprising the polyethylene blend is mixed with a foaming agent and extruded through an annular slit die (not shown) to form a thin walled tube. Air is introduced via a hole in the center of the die to blow up the tube like a balloon. Mounted on top of the die, a high-speed air ring (not shown) blows onto the hot film to cool it. The foam film is drawn in an upward direction, continually cooling, until it passes through nip rolls (not shown) where the tube is flattened to create what is known as a 'lay-flat' tube of film. This lay-flat or collapsed tube is then taken back down the extrusion tower (not shown) via more rollers. For high output lines, air inside the bubble may also be exchanged. The lay-flat film is either wound or the edges of the film are slit off to produce two flat film sheets and wound up onto reels to produce a tube of film. For lay-flat film, the tube can be made into bags, for example, by sealing across the width of film and cutting or perforating to make each bag. This operation can be performed either in line with the blown film process or at a later time. The blown film extrusion process is typically a continuous process.

It is to be understood that while the invention has been described in conjunction with the specific embodiments thereof, the foregoing description is intended to illustrate and not limit the scope of the invention. Other aspects, advantages, and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example I

In this example, secondary polyethylene blends were produced by blending two primary polyethylene blends. The primary polyethylene blends were produced by blending two polyethylene compositions. Each primary polyethylene blend comprises one polyethylene composition with lower density and one polyethylene composition with higher density, blended in amounts so that each primary polyethylene blend has a density of approximately 0.920 g/cm$^3$. Thus, the secondary polyethylene blends also have densities of approximately 0.920 g/cm$^3$. Additionally, each primary polyethylene blend has an MI ($I_2$) of about 1.0 g/10 min FIG. 1 shows thirteen reactor grades used as blending components (referred to herein as polyethylene compositions) or as a control (reference polyethylene composition). For example, D3 is a control or reference polyethylene composition having a density of 0.9216 g/cm$^3$ and an MI of 1.08 g/10 min.

Tables 1A through 1E provide the characterization of NMWD/NCD components (polyethylene compositions) and the control. Tables 2E through 2E teaches the primary polyethylene blend compositions and characterization. Tables 3A through 3D provide the secondary polyethylene blends formulations. Specifically, Tables 3A through 3D describe the secondary polyethylene blends by wt % of the primary blends. Tables 3E through 3H describe the secondary polyethylene blends by MI and density (DN) of the original components.

Tables 4A through 4D provide the secondary polyethylene blend characterization on film sample. Note that all of the secondary polyethylene blends in this study exhibits characteristics of broad CD, i.e., T75-T25 greater than 24 (or greater than 30 for those with outstanding stiffness and sealing.

TABLE 1A

Characterization of NMWD/NCD Components and Control in Blend DOE

| | | Components | |
|---|---|---|---|
| | | F1 | E2 |
| | | Design Targets Components for BOCD Catalyst | |
| | | OMC-1716 | OMC-1716 |
| MI | (dg/min) | 0.28 | 0.48 |
| HLMI | (dg/min) | 4.56 | 7.74 |
| MIR | ($I_{21}/I_2$) | 16.3 | 16.1 |
| Density | (g/cm$^3$) | 0.8961 | 0.9082 |
| H-NMR File # | | hctl201609040412 | hctl201609040410 |
| Vinylene | (/1000 C) | 0.02 | 0.01 |
| TSO | (/1000 C) | 0.03 | 0.02 |
| Vinylene | (/1000 C) | 0.01 | 0.01 |
| Vinylidene | (/1000 C) | 0.01 | 0.01 |
| Total Unsat | (/1000 C) | 0.07 | 0.05 |
| methyl w/o CE Correction | (/1000 C) | 29.0 | 19.8 |
| GPC-4D File # | | 116-2655 | 116-2491 |
| Mn GPC4D | (g/mol) | 67,414 | 52,319 |
| Mw GPC4D | (g/mol) | 166,205 | 140,928 |
| Mz GPC4D | (g/mol) | 283,446 | 245,047 |
| Mz + 1 GPC4D | (g/mol) | 426,847 | 367,377 |
| Mw/Mn GPC4D | | 2.47 | 2.69 |
| Mz/Mw GPC4D | | 1.71 | 1.74 |
| Bulk C6 | (wt %) | 17.33 | 11.85 |
| g'(Vis Ave.) | | 1.00 | 1.01 |
| Recover | (%) | 103% | 104% |
| Cryo-TREFIR5 Run # | | 16-1125 | 16-1123 |

TABLE 1A-continued

Characterization of NMWD/NCD Components and Control in Blend DOE

| | | Components | |
|---|---|---|---|
| | | F1 | E2 |
| | | Design Targets Components for BOCD Catalyst | |
| | | OMC-1716 | OMC-1716 |
| Mass Recovery | (%) | 95.74 | 98.73 |
| SF Weight Fraction | (%) | 0.58 | 0.42 |
| Tw | (° C.) | 58.58 | 70.42 |
| Tn | (° C.) | 54.13 | 49.73 |
| T75 − T25 | (° C.) | 9 | 10 |
| Pk1 - Tmp | (° C.) | 59.0 | 72.1 |
| Pk1 - Area | (%) | 99.4 | 99.6 |
| Pk2 - Tmp | (° C.) | | |
| Pk2 - Area | (%) | | |
| CFC File # | | 221-16CFC | 220-16CFC |
| $1^{st}$ Half from CFC | (%) | 46.8% | 51.6% |
| $2^{nd}$ Half from CFC | (%) | 53.2% | 48.4% |
| Mw1 | | 198,454 | 189,889 |
| Mw-1 + 2 | | 208,746 | 187,274 |
| Mw2 | | 217,885 | 184,501 |
| Tw1 | (° C.) | 50.4 | 63.3 |
| Tw1 + 2 | (° C.) | 57.4 | 70.5 |
| Tw2 | (° C.) | 63.6 | 78.1 |
| (log(Mw1/Mw2))/(Tw1 − Tw2) | | 0.0031 | −0.0008 |
| Mw1/Mw2 | | 0.91 | 1.03 |
| Tw1 − Tw2 | (° C.) | −13.2 | −14.8 |

TABLE 1B

Characterization of NMWD/NCD Components and Control in Blend DOE

| | | Components | |
|---|---|---|---|
| | | C4 | B5 |
| | | Design Targets Components for BOCD Catalyst | |
| | | EXP 1201 | OMC-1716 |
| MI | (dg/min) | 3.0 | 14.2 |
| HLMI | (dg/min) | 51 | 241 |
| MIR | ($I_{21}/I_2$) | 17.0 | 17.0 |
| Density | (g/cm$^3$) | 0.9389 | 0.9510 |
| H-NMR File # | | hctl20160904044 | hctl20160904042 |
| Vinylene | (/1000 C) | 0.07 | 0.01 |
| TSO | (/1000 C) | 0.08 | 0.01 |
| Vinylene | (/1000 C) | 0.01 | 0.01 |
| Vinylidene | (/1000 C) | 0.01 | 0.00 |
| Total Unsat | (/1000 C) | 0.17 | 0.03 |
| methyl w/o CE Correction | (/1000 C) | 4.4 | 3.4 |
| GPC-4D File # | | 116-2485 | 116-2651 |
| Mn GPC4D | (g/mol) | 31,208 | 17,408 |
| Mw GPC4D | (g/mol) | 86,944 | 55,977 |
| Mz GPC4D | (g/mol) | 168,938 | 105,252 |
| Mz + 1 GPC4D | (g/mol) | 289,573 | 164,332 |
| Mw/Mn GPC4D | | 2.79 | 3.22 |
| Mz/Mw GPC4D | | 1.94 | 1.88 |
| Bulk C6 | (wt %) | 2.53 | 1.48 |
| g'(Vis Ave.) | | 1.00 | 1.03 |
| Recover | (%) | 100% | 100% |
| Cryo-TREFIR5 Run # | | 16-1117 | 16-1115 |
| Mass Recovery | (%) | 101.33 | 99.57 |
| SF Weight Fraction | (%) | 0.26 | 0.39 |
| Tw | (° C.) | 91.39 | 92.44 |
| Tn | (° C.) | 86.56 | 88.85 |
| T75 − T25 | (° C.) | 2 | 2 |
| Pk1 - Tmp | (° C.) | 93.3 | 94.7 |

TABLE 1B-continued

Characterization of NMWD/NCD Components and Control in Blend DOE

| | | Components | |
|---|---|---|---|
| | | C4 | B5 |
| | | Design Targets Components for BOCD Catalyst | |
| | | EXP 1201 | OMC-1716 |
| Pk1 - Area | (%) | 99.7 | 99.6 |
| Pk2 - Tmp | (° C.) | | |
| Pk2 - Area | (%) | | |
| CFC File # | | 238-16CFC | 231-16CFC |
| 1$^{st}$ Half from CFC | (%) | 44.8% | 44.8% |
| 2$^{nd}$ Half from CFC | (%) | 55.2% | 55.2% |
| Mw1 | | 115,428 | 60,391 |
| Mw-1 + 2 | | 116,087 | 74,146 |
| Mw2 | | 116,599 | 84,872 |
| Tw1 | (° C.) | 91.4 | 93.4 |
| Tw1 + 2 | (° C.) | 93.8 | 95.8 |
| Tw2 | (° C.) | 95.7 | 97.7 |
| (log(Mw1/Mw2))/(Tw1 − Tw2) | | 0.0010 | 0.0346 |
| Mw1/Mw2 | | 0.99 | 0.71 |
| Tw1 − Tw2 | (° C.) | −4.3 | −4.3 |

TABLE 1C

Characterization of NMWD/NCD Components and Control in Blend DOE

| | | Components | |
|---|---|---|---|
| | | B1 | C2 |
| | | Design Targets Components for Conventional CD Catalyst | |
| | | OMC-1716 | OMC-1716 |
| MI | (dg/min) | 7.8 | 3.1 |
| HLMI | (dg/min) | 135 | 49 |
| MIR | ($I_{21}/I_2$) | 17.3 | 16.0 |
| Density | (g/cm$^3$) | 0.8983 | 0.9078 |
| H-NMR File # | | hctl20160904041 | hctl20160904043 |
| Vinylene | (/1000 C) | 0.02 | 0.07 |
| TSO | (/1000 C) | 0.04 | 0.14 |
| Vinylene | (/1000 C) | 0.00 | 0.03 |
| Vinylidene | (/1000 C) | 0.00 | 0.00 |
| Total Unsat | (/1000 C) | 0.06 | 0.24 |
| methyl w/o CE Correction | (/1000 C) | 31.5 | 22.7 |
| GPC-4D File # | | 116-2482 | 116-2484 |
| Mn GPC4D | (g/mol) | 27,956 | 32,985 |
| Mw GPC4D | (g/mol) | 67,905 | 85,606 |
| Mz GPC4D | (g/mol) | 112,947 | 146,301 |
| Mz + 1 GPC4D | (g/mol) | 166,117 | 217,119 |
| Mw/Mn GPC4D | | 2.43 | 2.60 |
| Mz/Mw GPC4D | | 1.66 | 1.71 |
| Bulk C6 | (wt %) | 19.3 | 13.46 |
| g'(Vis Ave.) | | 0.98 | 1.01 |
| Recover | (%) | 104% | 100% |
| Cryo-TREFIR5 Run # | | 16-1114 | 16-1116 |
| Mass Recovery | (%) | 95.96 | 98.91 |
| SF Weight Fraction | (%) | 1.52 | 0.65 |
| Tw | (° C.) | 51.95 | 64.85 |
| Tn | (° C.) | 47.41 | 60.04 |
| T75 − T25 | (° C.) | 13 | 12 |
| Pk1 - Tmp | (° C.) | 54.1 | 67.6 |
| Pk1 - Area | (%) | 98.5 | 99.4 |
| Pk2 - Tmp | (° C.) | | |
| Pk2 - Area | (%) | | |
| CFC File # | | 215-16CFC | 216-16CFC |
| 1$^{st}$ Half from CFC | (%) | 53.1% | 48.3% |
| 2$^{nd}$ Half from CFC | (%) | 46.9% | 51.7% |

TABLE 1C-continued

Characterization of NMWD/NCD Components and Control in Blend DOE

| | | Components | |
|---|---|---|---|
| | | B1 | C2 |
| | | Design Targets Components for Conventional CD Catalyst | |
| | | OMC-1716 | OMC-1716 |
| Mw1 | | 69,109 | 93,584 |
| Mw-1 + 2 | | 77,308 | 99,707 |
| Mw2 | | 86,796 | 105,294 |
| Tw1 | (° C.) | 42.0 | 56.6 |
| Tw1 + 2 | (° C.) | 50.3 | 65.3 |
| Tw2 | (° C.) | 60.0 | 73.2 |
| (log(Mw1/Mw2))/(Tw1 − Tw2) | | 0.0055 | 0.0031 |
| Mw1/Mw2 | | 0.80 | 0.89 |
| Tw1 − Tw2 | (° C.) | −18.1 | −16.5 |

TABLE 1D

Characterization of NMWD/NCD Components and Control in Blend DOE

| | | Components | |
|---|---|---|---|
| | | E4 | F5 |
| | | Design Targets Components for Conventional CD Catalyst | |
| | | EXP 1201 | EXP 1201 |
| MI | (dg/min) | 0.44 | 0.20 |
| HLMI | (dg/min) | 7.33 | 3.67 |
| MIR | ($I_{21}/I_2$) | 16.7 | 18.4 |
| Density | (g/cm$^3$) | 0.9369 | 0.9516 |
| H-NMR File # | | hctl201609040411 | hctl20160904013 |
| Vinylene | (/1000 C) | 0.11 | 0.06 |
| TSO | (/1000 C) | 0.06 | 0.01 |
| Vinylene | (/1000 C) | 0.00 | 0.00 |
| Vinylidene | (/1000 C) | 0.01 | 0.00 |
| Total Unsat | (/1000 C) | 0.18 | 0.07 |
| methyl w/o CE Correction | (/1000 C) | 2.7 | 0.9 |
| GPC-4D File # | | 116-2492 | 116-2656 |
| Mn GPC4D | (g/mol) | 55,897 | 56,697 |
| Mw GPC4D | (g/mol) | 149,248 | 188,670 |
| Mz GPC4D | (g/mol) | 294,490 | 426,898 |
| Mz + 1 GPC4D | (g/mol) | 542,631 | 920,720 |
| Mw/Mn GPC4D | | 2.67 | 3.33 |
| Mz/Mw GPC4D | | 1.97 | 2.26 |
| Bulk C6 | (wt %) | 1.61 | 0.37 |
| g'(Vis Ave.) | | 1.03 | 1.02 |
| Recover | (%) | 99% | 101% |
| Cryo-TREFIR5 Run # | | 16-1124 | 16-1126 |
| Mass Recovery | (%) | 98.76 | 102.88 |
| SF Weight Fraction | (%) | 0.3 | 0.42 |
| Tw | (° C.) | 93.96 | 96.79 |
| Tn | (° C.) | 85.19 | 85.8 |
| T75 − T25 | (° C.) | 1 | 1 |
| Pk1 - Tmp | (° C.) | 94.7 | 97.8 |
| Pk1 - Area | (%) | 99.7 | 99.6 |
| Pk2 - Tmp | (° C.) | | |
| Pk2 - Area | (%) | | |
| CFC File # | | 236-16CFC | 237-16CFC |
| 1$^{st}$ Half from CFC | (%) | 40.2% | 65.2% |
| 2$^{nd}$ Half from CFC | (%) | 59.8% | 34.8% |
| Mw1 | | 175,342 | 286,156 |
| Mw-1 + 2 | | 196,580 | 267,874 |
| Mw2 | | 209,475 | 235,794 |
| Tw1 | (° C.) | 78.5 | 103.8 |
| Tw1 + 2 | (° C.) | 89.9 | 103.0 |
| Tw2 | (° C.) | 96.8 | 101.7 |

TABLE 1D-continued

Characterization of NMWD/NCD Components and Control in Blend DOE

| | | Components | |
|---|---|---|---|
| | | E4 | F5 |
| | | Design Targets Components for Conventional CD Catalyst | |
| | | EXP 1201 | EXP 1201 |
| (log(Mw1/Mw2))/(Tw1 − Tw2) | | 0.0042 | 0.0401 |
| Mw1/Mw2 | | 0.84 | 1.21 |
| Tw1 − Tw2 | (° C.) | −18.4 | 2.1 |

TABLE 1E

Characterization of NMWD/NCD Components and Control in Blend DOE

| | | Components | |
|---|---|---|---|
| | | DE | Exceed 1018 |
| | | Design Targets NMWD/NCD as Control Catalyst | |
| | | OMC-1716 | Commercial |
| MI | (dg/min) | 1.08 | 0.99 |
| HLMI | (dg/min) | 17.4 | 15.1 |
| MIR | ($I_{21}/I_2$) | 16.1 | 15.2 |
| Density | (g/cm$^3$) | 0.9216 | 0.9187 |
| H-NMR File # | | hct120160904047 | |
| Vinylene | (/1000 C) | 0.01 | 0.01 |
| TSO | (/1000 C) | 0.02 | 0.05 |
| Vinylene | (/1000 C) | 0.01 | 0.06 |
| Vinylidene | (/1000 C) | 0.01 | 0.02 |
| Total Unsat | (/1000 C) | 0.05 | 0.13 |
| methyl w/o CE Correction | (/1000 C) | 10.4 | 11.7 |
| GPC-4D File # | | 116-2488 | 17-1057 |
| Mn GPC4D | (g/mol) | 39,572 | 42,694 |
| Mw GPC4D | (g/mol) | 113,015 | 115,629 |
| Mz GPC4D | (g/mol) | 200,955 | 207,754 |
| Mz + 1 GPC4D | (g/mol) | 304,113 | 321,990 |
| Mw/Mn GPC4D | | 2.86 | 2.71 |
| Mz/Mw GPC4D | | 1.78 | 1.80 |
| Bulk C6 | (wt %) | 5.97 | 6.3 |
| g' (Vis Ave.) | | 0.99 | |
| Recover | (%) | 101% | 101% |
| Cryo-TREFIR5 Run # | | 16-1120 | 18-0093 |
| Mass Recovery | (%) | 100.6 | 98.39 |
| SF Weight Fraction | (%) | 0.26 | 0.23 |
| Tw | (° C.) | 82.88 | 81.98 |
| Tn | (° C.) | 67.3 | 79.96 |
| T75-T25 | (° C.) | 7 | 10 |
| Pk1-Tmp | (° C.) | 87.8 | 83.6 |
| Pk1-Area | (%) | 99.7 | 99.8 |
| Pk2-Tmp | (° C.) | | |
| Pk2-Area | (%) | | |
| CFC File # | | 239-16CFC | 150-17CFC |
| 1$^{st}$ Half from CFC | (%) | 47.2% | 49.4% |
| 2$^{nd}$ Half from CFC | (%) | 52.8% | 50.6% |
| Mw1 | | 155,572 | 165,078 |
| Mw-1 + 2 | | 154,407 | 156,788 |
| Mw2 | | 153,391 | 148,679 |
| Tw1 | (° C.) | 79.6 | 75.5 |
| Tw1 + 2 | (° C.) | 84.6 | 82.0 |
| Tw2 (° C.) | | 89.0 | 88.3 |
| (log(Mw1/Mw2))/(Tw1-Tw2) | | −0.0007 | −0.0036 |
| Mw1/Mw2 | | 1.01 | 1.11 |
| Tw1-Tw2 | (° C.) | −9.4 | −12.8 |

TABLE 2A

Primary Blend Composition and Characterization

| | | BOCD Blends | |
|---|---|---|---|
| | | F1B5 | E2B5 |
| | | BCT-206552 | BCT-206553 |
| Blend Composition | | 56% F1 44% B5 | 71% E2 29% B5 |
| MI | (dg/min) | 0.93 | 0.96 |
| HLMI | (dg/min) | 22.3 | 18.2 |
| MIR | ($I_{21}/I_2$) | 24.0 | 19.0 |
| Density | (g/cm$^3$) | 0.919 | 0.918 |
| H-NMR File # | | hct201607225713 | hct201607225714 |
| Vinylene | (/1000 C) | 0.01 | 0.01 |
| TSO | (/1000 C) | 0.02 | 0.01 |

TABLE 2A-continued

Primary Blend Composition and Characterization

|  |  | BOCD Blends | |
|---|---|---|---|
| Blend Composition |  | F1B5<br>BCT-206552<br>56% F1<br>44% B5 | E2B5<br>BCT-206553<br>71% E2<br>29% B5 |
| Vinylene | (/1000 C) | 0.00 | 0.00 |
| Vinylidene | (/1000 C) | 0.00 | 0.00 |
| Total Unsat | (/1000 C) | 0.03 | 0.02 |
| methyl w/o CE Correction | (/1000 C) | 18.1 | 15.2 |
| GPC-4D Run # |  | 16-2468 | 16-2469 |
| Mn GPC4D | (g/mol) | 30,370 | 33,398 |
| Mw GPC4D | (g/mol) | 118,267 | 115,936 |
| Mz GPC4D | (g/mol) | 242,682 | 223,565 |
| Mz + 1 GPC4D | (g/mol) | 385,413 | 348,192 |
| Mw/Mn GPC4D |  | 3.89 | 3.47 |
| Mz/Mw GPC4D |  | 2.05 | 1.93 |
| Bulk C6 | (wt %) | 10.53 | 8.52 |
| g'(Vis Ave.) |  | 0.945 | 0.989 |
| Recover | (%) | 100% | 100% |
| Cryo-TREFIR5 Run # |  | 16-1019 | 16-1020 |
| SF Weight Fraction | (%) | 0.62 | 0.43 |
| Tw | (° C.) | 73.2 | 76.94 |
| Tn | (° C.) | 64.36 | 71.22 |
| T75 − T25 | (° C.) | 37 | 24 |
| Pk1 − Tmp | (° C.) | 59.0 | 71.8 |
| Pk1 − Area | (%) | 57.8 | 66.9 |
| Pk2 − Tmp | (° C.) | 94.3 | 93.9 |
| Pk2 − Area (LD component) | (%) | 41.5 | 32.7 |
| CFC File # |  | 202-16CFC | 204-16CFC |
| 1$^{st}$ Half from CFC | (%) | 56.7% | 74.0% |
| 2$^{nd}$ Half from CFC | (%) | 43.3% | 26.0% |
| Mw1 |  | 215,714 | 174,915 |
| Mw-1 + 2 |  | 156,719 | 151,915 |
| Mw2 |  | 80,415 | 87,233 |
| Tw1 | (° C.) | 57.6 | 70.6 |
| Tw1 + 2 | (° C.) | 73.5 | 77.2 |
| Tw2 | (° C.) | 94.0 | 95.6 |
| (log(Mw1/Mw2))/(Tw1 − Tw2) |  | −0.0118 | −0.0121 |
| Mw1/Mw2 |  | 2.68 | 2.01 |
| Tw1 − Tw2 | (° C.) | −36.4 | −24.9 |

TABLE 2B

Primary Blend Composition and Characterization

|  |  | BOCD Blends | |
|---|---|---|---|
| Blend Composition |  | F1C4<br>BCT-206554<br>40% F1<br>60% C4 | E2C4<br>BCT-206555<br>57% E2<br>43% C4 |
| MI | (dg/min) | 0.96 | 0.96 |
| HLMI | (dg/min) | 18.7 | 16.6 |
| MIR | ($I_{21}/I_2$) | 19.4 | 17.3 |
| Density | (g/cm$^3$) | 0.920 | 0.920 |
| H-NMR File # |  | hctl201607225715 | hctl201607225716 |
| Vinylene | (/1000 C) | 0.05 | 0.03 |
| TSO | (/1000 C) | 0.06 | 0.04 |
| Vinylene | (/1000 C) | 0.01 | 0.00 |
| Vinylidene | (/1000 C) | 0.01 | 0.01 |
| Total Unsat | (/1000 C) | 0.13 | 0.08 |
| methyl w/o CE Correction | (/1000 C) | 14.5 | 13.4 |
| GPC-4D Run # |  | 16-2523 | 16-2471 |
| Mn GPC4D | (g/mol) | 39,789 | 40,654 |
| Mw GPC4D | (g/mol) | 118,092 | 118,003 |
| Mz GPC4D | (g/mol) | 229,354 | 221,081 |
| Mz + 1 GPC4D | (g/mol) | 373,726 | 352,137 |
| Mw/Mn GPC4D |  | 2.97 | 2.90 |

TABLE 2B-continued

Primary Blend Composition and Characterization

| | | BOCD Blends | |
|---|---|---|---|
| | | F1C4 | E2C4 |
| | | BCT-206554 | BCT-206555 |
| | | 40% F1 | 57% E2 |
| Blend Composition | | 60% C4 | 43% C4 |
| Mz/Mw GPC4D | | 1.94 | 1.87 |
| Bulk C6 | (wt %) | 7.96 | 7.76 |
| g'(Vis Ave.) | | 0.980 | 1.004 |
| Recover | (%) | 100% | 101% |
| Cryo-TREFIR5 Run # | | 16-1021 | 16-1022 |
| SF Weight Fraction | (%) | 0.45 | 0.49 |
| Tw | (° C.) | 78.73 | 79.76 |
| Tn | (° C.) | 70.31 | 43.62 |
| T75 − T25 | (° C.) | 33 | 23 |
| Pk1 - Tmp | (° C.) | 59.0 | 71.6 |
| Pk1 - Area | (%) | 37.3 | 50.8 |
| Pk2 - Tmp | (° C.) | 93.1 | 92.9 |
| Pk2 - Area (LD component) | (%) | 62.3 | 48.7 |
| CFC File # | | 203-16CFC | 205-16CFC |
| $1^{st}$ Half from CFC | (%) | 40.0% | 58.8% |
| $2^{nd}$ Half from CFC | (%) | 60.0% | 41.2% |
| Mw1 | | 208,027 | 169,953 |
| Mw-1 + 2 | | 153,601 | 144,945 |
| Mw2 | | 117,892 | 109,577 |
| Tw1 | (° C.) | 57.9 | 71.0 |
| Tw1 + 2 | (° C.) | 79.1 | 80.3 |
| Tw2 | (° C.) | 93.1 | 93.5 |
| (log(Mw1/Mw2))/(Tw1 − Tw2) | | −0.0070 | −0.0085 |
| Mw1/Mw2 | | 1.76 | 1.55 |
| Tw1 − Tw2 | (° C.) | −35.2 | −22.5 |

TABLE 2C

Primary Blend Composition and Characterization

| | | Conventional CD Blends | |
|---|---|---|---|
| | | B1F5 | C2F5 |
| | | BCT-206556 | BCT-206558 |
| | | 57% B1 | 70% C2 |
| Blend Composition | | 43% F5 | 30% F5 |
| MI | (dg/min) | 1.03 | 1.09 |
| HLMI | (dg/min) | 23.1 | 20.6 |
| MIR | ($I_{21}/I_2$) | 22.4 | 18.9 |
| Density | (g/cm$^3$) | 0.920 | 0.919 |
| H-NMR File # | | hctl201607225717 | hctl201607225719 |
| Vinylene | (/1000 C) | 0.03 | 0.02 |
| TSO | (/1000 C) | 0.00 | 0.02 |
| Vinylene | (/1000 C) | 0.01 | 0.00 |
| Vinylidene | (/1000 C) | 0.00 | 0.01 |
| Total Unsat | (/1000 C) | 0.04 | 0.05 |
| methyl w/o CE Correction | (/1000 C) | 19.3 | 16.7 |
| GPC-4D Run # | | 16-2549 | 16-2474 |
| Mn GPC4D | (g/mol) | 34,439 | 37,636 |
| Mw GPC4D | (g/mol) | 124,443 | 118,448 |
| Mz GPC4D | (g/mol) | 344,355 | 292,905 |
| Mz + 1 GPC4D | (g/mol) | 781,081 | 671,307 |
| Mw/Mn GPC4D | | 3.61 | 3.15 |
| Mz/Mw GPC4D | | 2.77 | 2.47 |
| Bulk C6 | (wt %) | 10.87 | 9.46 |
| g'(Vis Ave.) | | 1.027 | 1.012 |
| Recover | (%) | 99% | 100% |
| Cryo-TREFIR5 Run # | | 16-1044 | 16-1046 |
| SF Weight Fraction | (%) | 0.86 | 0.35 |
| Tw | (° C.) | 72.67 | 75.4 |
| Tn | (° C.) | 62.14 | 68.78 |
| T75 − T25 | (° C.) | 46 | 34 |
| Pk1 - Tmp | (° C.) | 54.2 | 67.2 |
| Pk1 - Area | (%) | 53.4 | 64.2 |

TABLE 2C-continued

Primary Blend Composition and Characterization

| | | Conventional CD Blends | |
|---|---|---|---|
| | | B1F5 | C2F5 |
| | | BCT-206556 | BCT-206558 |
| Blend Composition | | 57% B1<br>43% F5 | 70% C2<br>30% F5 |
| Pk2 - Tmp | (° C.) | 97.4 | 96.9 |
| Pk2 - Area (LD component) | (%) | 45.8 | 35.4 |
| CFC File # | | 201-16CFC | 207-16CFC |
| 1$^{st}$ Half from CFC | (%) | 55.3% | 68.4% |
| 2$^{nd}$ Half from CFC | (%) | 44.7% | 31.6% |
| Mw1 | | 82,070 | 104,587 |
| Mw-1 + 2 | | 174,440 | 165,860 |
| Mw2 | | 292,715 | 305,085 |
| Tw1 | (° C.) | 50.3 | 63.7 |
| Tw1 + 2 | (° C.) | 72.1 | 74.8 |
| Tw2 | (° C.) | 100.1 | 100.0 |
| (log(Mw1/Mw2))/(Tw1 − Tw2) | | 0.0111 | 0.0128 |
| Mw1/Mw2 | | 0.28 | 0.34 |
| Tw1 − Tw2 | (° C.) | −49.8 | −36.3 |

TABLE 2D

Primary Blend Composition and Characterization

| | | Conventional CD Blends | |
|---|---|---|---|
| | | B1E4 | C2E4 |
| | | BCT-206557 | BCT206559 |
| Blend Composition | | 39% B1<br>61% E4 | 53% C2<br>47% E4 |
| MI | (dg/min) | 1.04 | 1.09 |
| HLMI | (dg/min) | 19.2 | 18.4 |
| MIR | ($I_{21}/I_2$) | 18.4 | 16.9 |
| Density | (g/cm$^3$) | 0.922 | 0.921 |
| H-NMR File # | | hctl201607225718 | hctl201607225920 |
| Vinylene | (/1000 C) | 0.07 | 0.06 |
| TSO | (/1000 C) | 0.05 | 0.04 |
| Vinylene | (/1000 C) | 0.01 | 0.00 |
| Vinylidene | (/1000 C) | 0.01 | 0.00 |
| Total Unsat | (/1000 C) | 0.14 | 0.10 |
| methyl w/o CE Correction | (/1000 C) | 14.4 | 14.2 |
| GPC-4D Run # | | 16-2473 | 16-2475 |
| Mn GPC4D | (g/mol) | 39,193 | 39,901 |
| Mw GPC4D | (g/mol) | 120,501 | 116,164 |
| Mz GPC4D | (g/mol) | 226,245 | 240,887 |
| Mz + 1 GPC4D | (g/mol) | 525,790 | 455,451 |
| Mw/Mn GPC4D | | 3.07 | 2.91 |
| Mz/Mw GPC4D | | 1.88 | 2.07 |
| Bulk C6 | (wt %) | 8.29 | 8.02 |
| g'(Vis Ave.) | | 1.033 | 1.040 |
| Recover | (%) | 101% | 101% |
| Cryo-TREFIR5 Run # | | 16-1045 | 16-1047 |
| SF Weight Fraction | (%) | 0.47 | 0.37 |
| Tw | (° C.) | 78.02 | 78.65 |
| Tn | (° C.) | 68.69 | 72.35 |
| T75 − T25 | (° C.) | 39 | 30 |
| Pk1 - Tmp | (° C.) | 54.7 | 67.3 |
| Pk1 - Area | (%) | 38.0 | 49.7 |
| Pk2 - Tmp | (° C.) | 94.4 | 94.4 |
| Pk2 - Area (ED component) | (%) | 61.6 | 49.9 |
| CFC File # | | 206-16CFC | 208-16CFC |
| 1$^{st}$ Half from CFC | (%) | 38.8% | 53.2% |
| 2$^{nd}$ Half from CFC | (%) | 61.2% | 46.8% |
| Mw1 | | 77,060 | 98,864 |
| Mw-1 + 2 | | 160,795 | 147,613 |
| Mw2 | | 214,922 | 202,198 |

TABLE 2D-continued

Primary Blend Composition and Characterization

| | | Conventional CD Blends | |
|---|---|---|---|
| | | B1E4 BCT-206557 39% B1 | C2E4 BCT206559 53% C2 |
| Blend Composition | | 61% E4 | 47% E4 |
| Tw1 | (° C.) | 53.7 | 65.1 |
| Tw1 + 2 | (° C.) | 80.8 | 79.6 |
| Tw2 | (° C.) | 98.4 | 95.9 |
| (log(Mw1/Mw2))/(Tw1 − Tw2) | | 0.0100 | 0.0101 |
| Mw1/Mw2 | | 0.36 | 0.49 |
| Tw1 − Tw2 | (° C.) | −44.7 | −30.9 |

TABLE 2E

Primary Blend Composition and Characterization

| | | NMWD/NCD Controls | |
|---|---|---|---|
| | | D3 BCT-206293 | Exceed 1018 BCT-236471 |
| Blend Composition | | 100% D3 | 100% Exceed 1018 |
| MI | (dg/min) | 1.08 | .99 |
| HLMI | (dg/min) | 16.8 | 15.1 |
| MIR | ($I_{21}/I_2$) | 15.6 | 15.2 |
| Density | (g/cm$^3$) | 0.920 | 0.919 |
| H-NMR File # | | hctl201607225725 | |
| Vinylene | (/1000 C) | 0.01 | 0.01 |
| TSO | (/1000 C) | 0.02 | 0.05 |
| Vinylene | (/1000 C) | 0.01 | 0.06 |
| Vinylidene | (/1000 C) | 0.01 | 0.02 |
| Total Unsat | (/1000 C) | 0.05 | 0.13 |
| methyl w/o CE Correction | (/1000 C) | 10.5 | 11.7 |
| GPC-4D Run # | | 16-2480 | 17-1057 |
| Mn GPC4D | (g/mol) | 38,826 | 42,694 |
| Mw GPC4D | (g/mol) | 112,293 | 115,629 |
| Mz GPC4D | (g/mol) | 199,594 | 207,754 |
| Mz + 1 GPC4D | (g/mol) | 301,719 | 321,990 |
| Mw/Mn GPC4D | | 2.89 | 2.71 |
| Mz/Mw GPC4D | | 1.78 | 1.80 |
| Bulk C6 | (wt %) | 6.17 | 6.30 |
| g'(Vis Ave.) | | 1.022 | — |
| Recover | (%) | 101% | 101% |
| Cryo-TREFIR5 Run # | | 16-1048 | 18-0093 |
| SF Weight Fraction | (%) | 0.36 | 0.23 |
| Tw | (° C.) | 82.35 | 81.98 |
| Tn | (° C.) | 73.3 | 79.96 |
| T75 − T25 | (° C.) | 7 | 10 |
| Pk1 - Tmp | (° C.) | 87.8 | 83.6 |
| Pk1 - Area | (%) | 99.6 | 99.8 |
| Pk2 - Tmp | (° C.) | — | — |
| Pk2 - Area (ED component) | (%) | — | — |
| CFC File # | | 211-16CFC | 150-16CFC |
| 1$^{st}$ Half from CFC | (%) | 48.3% | 49.4% |
| 2$^{nd}$ Half from CFC | (%) | 51.7% | 50.6% |
| Mw1 | | 152,348 | 165,078 |
| Mw-1 + 2 | | 152,806 | 156,788 |
| Mw2 | | 153,228 | 148,679 |
| Tw1 | (° C.) | 77.8 | 75.5 |
| Tw1 + 2 | (° C.) | 83.2 | 82.0 |
| Tw2 | (° C.) | 88.1 | 88.3 |
| (log(Mw1/Mw2))/(Tw1 − Tw2) | | 0.0002 | −0.0036 |
| Mw1/Mw2 | | 0.99 | 1.11 |
| Tw1 − Tw2 | (° C.) | −10.3 | −12.8 |

TABLE 3A

Secondary Blend Formulation

| Primary Blends | wt %-1 | wt %-2 | Secondary Blend Composition 4CB-15 | 4CB-24 |
|---|---|---|---|---|
| F1B5 | 56% | 44% | 50.0% | |
| E2B5 | 71% | 29% | | |
| F1C4 | 40% | 60% | | |
| E2C4 | 57% | 43% | | 50% |
| Exceed 1018 | 100% | | | |
| B1F5 | 57% | 43% | 50.0% | |
| B1E4 | 39% | 61% | | |
| C2F5 | 70% | 30% | | |
| C2E4 | 53% | 47% | | 50.0% |

TABLE 3B

Secondary Blend Formulation

| Primary Blends | wt %-1 | wt %-2 | Secondary Blend Composition 4CB-14 | 4CB-25 |
|---|---|---|---|---|
| F1B5 | 56% | 44% | | |
| E2B5 | 71% | 29% | | 50.0% |
| F1C4 | 40% | 60% | 50.0% | |
| E2C4 | 57% | 43% | | |
| Exceed 1018 | 100% | | | |
| B1F5 | 57% | 43% | | |
| B1E4 | 39% | 61% | 50.0% | |
| C2F5 | 70% | 30% | | 50.0% |
| C2E4 | 53% | 47% | | |

TABLE 3C

Secondary Blend Formulation

| Primary Blends | wt %-1 | wt %-2 | Secondary Blend Composition 5CB-135 | 5CB-234 |
|---|---|---|---|---|
| F1B5 | 56% | 44% | 40.0% | |
| E2B5 | 71% | 29% | | |
| F1C4 | 40% | 60% | | |
| E2C4 | 57% | 43% | | 40.0% |
| Exceed 1018 | 100% | | 20.0% | 20.0% |
| B1F5 | 57% | 43% | 40.0% | |
| B1E4 | 39% | 61% | | |
| C2F5 | 70% | 30% | | |
| C2E4 | 53% | 47% | | 40.0% |

TABLE 3D

Secondary Blend Formulation

| Primary Blends | wt %-1 | wt %-2 | Secondary Blend Composition 9CB-12345 |
|---|---|---|---|
| F1B5 | 56% | 44% | 22.0% |
| E2B5 | 71% | 29% | |
| F1C4 | 40% | 60% | |
| E2C4 | 57% | 43% | 22.0% |
| Exceed 1018 | 100% | | 12.0% |
| B1F5 | 57% | 43% | 22.0% |
| B1E4 | 39% | 61% | |
| C2F5 | 70% | 30% | |
| C2E4 | 53% | 47% | 22.0% |

TABLE 3E

Secondary Blend Formulation

| Original Components | MI | DN | Secondary Blend Composition 4CB-15 | 4CB-24 |
|---|---|---|---|---|
| F1 | 0.28 | 0.896 | 28.0% | |
| B1 | 7.83 | 0.898 | 28.5% | |
| E2 | 0.48 | 0.908 | | 28.5% |
| C2 | 3.07 | 0.908 | | 26.5% |
| Exceed 1018 | 1.00 | 0.919 | | |
| E4 | 0.44 | 0.937 | | 23.5% |
| C4 | 3.00 | 0.939 | | 21.5% |
| F5 | 0.20 | 0.952 | 21.5% | |
| B5 | 14.19 | 0.951 | 22.0% | |

TABLE 3F

Secondary Blend Formulation

| Original Components | MI | DN | Secondary Blend Composition 4CB-14 | 4CB-25 |
|---|---|---|---|---|
| F1 | 0.28 | 0.896 | 20.0% | |
| B1 | 7.83 | 0.898 | 19.5% | |
| E2 | 0.48 | 0.908 | | 35.5% |
| C2 | 3.07 | 0.908 | | 35.0% |
| Exceed 1018 | 1.00 | 0.919 | | |
| E4 | 0.44 | 0.937 | 30.5% | |
| C4 | 3.00 | 0.939 | 30.0% | |
| F5 | 0.20 | 0.952 | | 15.0% |
| B5 | 14.19 | 0.951 | | 14.5% |

TABLE 3G

Secondary Blend Formulation

| Original Components | MI | DN | Secondary Blend Composition 5CB-135 | 5CB-234 |
|---|---|---|---|---|
| F1 | 0.28 | 0.896 | 22.4% | |
| B1 | 7.83 | 0.898 | 22.8% | |
| E2 | 0.48 | 0.908 | | 22.8% |
| C2 | 3.07 | 0.908 | | 21.2% |
| Exceed 1018 | 1.00 | 0.919 | 20.0% | 20.0% |
| E4 | 0.44 | 0.937 | | 18.8% |
| C4 | 3.00 | 0.939 | | 17.2% |
| F5 | 0.20 | 0.952 | 17.2% | |
| B5 | 14.19 | 0.951 | 17.6% | |

TABLE 3H

Secondary Blend Formulation

| Original Components | MI | DN | Secondary Blend 9CB-1234 |
|---|---|---|---|
| F1 | 0.28 | 0.896 | 12.3% |
| B1 | 7.83 | 0.898 | 12.5% |
| E2 | 0.48 | 0.908 | 12.5% |
| C2 | 3.07 | 0.908 | 11.7% |
| Excd 1018 | 1.00 | 0.919 | 12.0% |
| E4 | 0.44 | 0.937 | 10.3% |
| C4 | 3.00 | 0.939 | 9.5% |
| F5 | 0.20 | 0.952 | 9.5% |
| B5 | 14.19 | 0.951 | 9.7% |

TABLE 4A

Secondary Blend Characterization on Film Sample

|  |  | 4CB-15 | 4CB-24 |
|---|---|---|---|
| H-NMR File # |  | 201711034381 | 201711034382 |
| vinylene | (/1000 C) | 0.12 | 0.05 |
| TSO | (/1000 C) | 0.27 | 0.02 |
| vinylene | (/1000 C) | 0.04 | 0.00 |
| vinylidene | (/1000 C) | 0.00 | 0.00 |
| Total Unsat | (/1000 C) | 0.43 | 0.07 |
| methyl w/o CE Correction | (/1000 C) | 18.7 | 13.5 |
| GPC-4D Run # |  | 18-0748 | 18-0749 |
| Mn GPC4D | (g/mol) | 33,621 | 41,096 |
| Mw GPC4D | (g/mol) | 118,029 | 113,145 |
| Mz GPC4D | (g/mol) | 316,691 | 228,752 |
| Mz + 1 GPC4D | (g/mol) | 955,888 | 414,216 |
| Mw/Mn GPC4D |  | 3.51 | 2.75 |
| Mz/Mw GPC4D |  | 2.68 | 2.02 |
| Bulk C6 | (wt %) | 10.31 | 7.46 |
| g'(Vis Ave.) |  | 1.009 | 1.014 |
| Recover | (%) | 104% | 102% |
| Cryo-TREFIR5 Run ID |  | 18-0321 | 18-0322 |
| Mass Recovery |  | 101.05 | 102.15 |
| SF Weight Fraction | (%) | 0.38 | 0.27 |
| Tw | (° C.) | 74.34 | 79.75 |
| Tn | (° C.) | 66.75 | 73.69 |
| T75 − T25 | (° C.) | 40.4 | 26.6 |
| Pk1 - Tmp | (° C.) | 57.9 | 69.9 |
| Pk1 - Area (LD component) | (%) | 56.1 | 51.5 |
| Pk2 - Tmp | (° C.) | 96.3 | 94.1 |
| Pk2 - Area (HD component) | (%) | 43.6 | 48.3 |
| Pk3 -Tmp |  |  |  |
| Pk3 - Area (additional) |  |  |  |
| CFC File # |  | 35-18CFC.rdf | 36-18CFC.rdf |
| 1$^{st}$ Half from CFC | (%) | 50.5% | 49.2% |
| 2$^{nd}$ Half from CFC | (%) | 49.5% | 50.8% |
| Mw1 |  | 152,088 | 140,538 |
| Mw-1 + 2 |  | 164,823 | 146,548 |
| Mw2 |  | 177,562 | 152,309 |
| Tw1 | (° C.) | 52.6 | 65.9 |
| Tw1 + 2 | (° C.) | 74.0 | 79.8 |
| Tw2 | (° C.) | 95.4 | 93.1 |
| (log(Mw1/Mw2))/(Tw1 − Tw2) |  | 0.0016 | 0.0013 |
| Mw1/Mw2 |  | 0.86 | 0.92 |
| Tw1 − Tw2 | (° C.) | −42.8 | −27.2 |

TABLE 4B

Secondary Blend Characterization on Film Sample

|  |  | 4CB-14 | 4CB-25 |
|---|---|---|---|
| H-NMR File # |  | 201711034383 | 201711034384 |
| vinylene | (/1000 C) | 0.26 | 0.10 |
| TSO | (/1000 C) | 0.14 | 0.05 |
| vinylene | (/1000 C) | 0.00 | 0.00 |
| vinylidene | (/1000 C) | 0.00 | 0.00 |
| Total Unsat | (/1000 C) | 0.40 | 0.15 |
| methyl w/o CE Correction | (/1000 C) | 15.1 | 16.1 |
| GPC-4D Run # |  | 18-0750 | 18-0751 |
| Mn GPC4D | (g/mol) | 40,243 | 36,384 |
| Mw GPC4D | (g/mol) | 114,379 | 113,168 |
| Mz GPC4D | (g/mol) | 243,631 | 257,290 |
| Mz + 1 GPC4D | (g/mol) | 456,888 | 546,285 |
| Mw/Mn GPC4D |  | 2.84 | 3.11 |
| Mz/Mw GPC4D |  | 2.13 | 2.27 |
| Bulk C6 | (wt %) | 7.88 | 8.79 |
| g'(Vis Ave.) |  | 1.016 | 1.013 |
| Recover | (%) | 101% | 102% |
| Cryo-TREFIR5 Run ID |  | 18-0323 | 18-0324 |
| Mass Recovery |  | 102.13 | 101.47 |
| SF Weight Fraction | (%) | 0.28 | 0.22 |
| Tw | (° C.) | 79.32 | 76.87 |

TABLE 4B-continued

Secondary Blend Characterization on Film Sample

|  |  | 4CB-14 | 4CB-25 |
|---|---|---|---|
| Tn | (° C.) | 71.19 | 72.23 |
| T75 − T25 | (° C.) | 35.1 | 30.0 |
| Pk1 - Tmp | (° C.) | 58.0 | 70.2 |
| Pk1 - Area (LD component) | (%) | 39.8 | 66.6 |
| Pk2 - Tmp | (° C.) | 94.2 | 96.0 |
| Pk2 - Area (HD component) | (%) | 60.0 | 33.2 |
| Pk3 -Tmp |  |  |  |
| Pk3 - Area (additional) |  |  |  |
| CFC File # |  | 37-18CFC.rdf | 38-18CFC.rdf |
| 1$^{st}$ Half from CFC | (%) | 50.1% | 50.2% |
| 2$^{nd}$ Half from CFC | (%) | 49.9% | 49.8% |
| Mw1 |  | 138,665 | 140,660 |
| Mw-1 + 2 |  | 157,716 | 149,808 |
| Mw2 |  | 176,429 | 158,859 |
| Tw1 | (° C.) | 63.4 | 63.3 |
| Tw1 + 2 | (° C.) | 79.8 | 76.8 |
| Tw2 | (° C.) | 95.8 | 90.2 |
| (log(Mw1/Mw2))/(Tw1 − Tw2) |  | 0.0032 | 0.0020 |
| Mw1/Mw2 |  | 0.79 | 0.89 |
| Tw1 − Tw2 | (° C.) | −32.4 | −26.9 |

TABLE 4C

Secondary Blend Characterization on Film Sample

|  |  | 5CB-135 | 5CB-234 |
|---|---|---|---|
| H-NMR File # |  | 201711034385 | 201711034386 |
| Vinylene | (/1000 C) | 0.07 | 0.09 |
| TSO | (/1000 C) | 0.04 | 0.05 |
| Vinylene | (/1000 C) | 0.01 | 0.01 |
| Vinylidene | (/1000 C) | 0.00 | 0.00 |
| Total Unsat | (/1000 C) | 0.12 | 0.15 |
| methyl w/o CE Correction | (/1000 C) | 18.6 | 13.2 |
| GPC-4D Run # |  | 18-0752 | 18-0753 |
| Mn GPC4D | (g/mol) | 35,368 | 41,608 |
| Mw GPC4D | (g/mol) | 117,224 | 112,134 |
| Mz GPC4D | (g/mol) | 278,602 | 221,738 |
| Mz + 1 GPC4D | (g/mol) | 608,732 | 396,620 |
| Mw/Mn GPC4D |  | 3.31 | 2.70 |
| Mz/Mw GPC4D |  | 2.38 | 1.98 |
| Bulk C6 | (wt %) | 9.48 | 7.18 |
| g'(Vis Ave.) |  | 1.009 | 1.021 |
| Recover | (%) | 102% | 102% |
| Cryo-TREFIR5 Run ID |  | 18-0325 | 18-0327 |
| Mass Recovery |  | 102.29 | 101.63 |
| SF Weight Fraction | (%) | 0.26 | 0.16 |
| Tw | (° C.) | 76.1 | 80.31 |
| Tn | (° C.) | 67.47 | 72.4 |
| T75 − T25 | (° C.) | 38.4 | 24.5 |
| Pk1 - Tmp | (° C.) | 57.5 | 70.1 |
| Pk1 - Area (LD component) | (%) | 43.7 | 52.9 |
| Pk2 - Tmp | (° C.) | 79.2 | 93.9 |
| Pk2 - Area (HD component) | (%) | 13.6 | 47.0 |
| Pk3 -Tmp |  | 95.9 |  |
| Pk3 - Area (additional) |  | 42.5 |  |
| CFC File # |  | 40-18CFC.rdf | 41-18CFC.rdf |
| 1$^{st}$ Half from CFC | (%) | 50.3% | 49.0% |
| 2$^{nd}$ Half from CFC | (%) | 49.7% | 51.0% |
| Mw1 |  | 151,291 | 147,777 |
| Mw-1 + 2 |  | 166,949 | 153,678 |
| Mw2 |  | 182,454 | 159,257 |
| Tw1 | (° C.) | 56.9 | 68.4 |
| Tw1 + 2 | (° C.) | 75.9 | 80.6 |
| Tw2 | (° C.) | 94.6 | 92.2 |
| (log(Mw1/Mw2))/(Tw1 − Tw2) |  | 0.0022 | 0.0014 |
| Mw1/Mw2 |  | 0.83 | 0.93 |
| Tw1 − Tw2 | (° C.) | −37.7 | −23.8 |

TABLE 4D

Secondary Blend Characterization on Film Sample

|  |  | 9CB-12345 | Excd1018 |
|---|---|---|---|
| H-NMR File # |  | 201711034387 | 201711034388 |
| Vinylene | (/1000 C) | 0.04 | 0.17 |
| TSO | (/1000 C) | 0.02 | 0.12 |
| Vinylene | (/1000 C) | 0.01 | 0.04 |
| Vinylidene | (/1000 C) | 0.00 | 0.00 |
| Total Unsat | (/1000 C) | 0.07 | 0.33 |
| methyl w/o CE Correction | (/1000 C) | 15.4 | 11.6 |
| GPC-4D Run # |  | 18-0754 | 18-0755 |
| Mn GPC4D | (g/mol) | 37,332 | 42,465 |
| Mw GPC4D | (g/mol) | 114,966 | 109,263 |
| Mz GPC4D | (g/mol) | 255,878 | 195,604 |
| Mz + 1 GPC4D | (g/mol) | 556,170 | 306,038 |
| Mw/Mn GPC4D |  | 3.08 | 2.57 |
| Mz/Mw GPC4D |  | 2.23 | 1.79 |
| Bulk C6 | (wt %) | 8.45 | 6.31 |
| g'(Vis Ave.) |  | 1.010 | 1.015 |
| Recover | (%) | 103% | 102% |
| Cryo-TREFIR5 Run ID |  | 18-0328 | 18-0329 |
| Mass Recovery |  | 101.92 | 102.53 |
| SF Weight Fraction | (%) | 0.24 | 0.14 |
| Tw | (° C.) | 77.94 | 81.93 |
| Tn | (° C.) | 64.48 | 67.61 |
| T75 − T25 | (° C.) | 32.1 | 9.7 |
| Pk1 - Tmp | (° C.) | 60.8 | 83.8 |
| Pk1 - Area (LD component) | (%) | 54.9 | 99.9 |
| Pk2 - Tmp | (° C.) | 95.0 |  |
| Pk2 - Area (HD component) | (%) | 44.8 |  |
| Pk3 -Tmp |  |  |  |
| Pk3 - Area (additional) |  |  |  |
| CFC File # |  | 42-18CFC.rdf | 43-18CFC.rdf |
| 1$^{st}$ Half front CFC | (%) | 48.9% | 51.4% |
| 2$^{nd}$ Half front CFC | (%) | 51.1% | 48.6% |
| Mw1 |  | 154,653 | 153,250 |
| Mw-1 + 2 |  | 163,278 | 143,882 |
| Mw2 |  | 171,407 | 134,158 |
| Tw1 | (° C.) | 61.4 | 77.3 |
| Tw1 + 2 | (° C.) | 77.9 | 82.5 |
| Tw2 | (° C.) | 93.6 | 87.9 |
| (log(Mw1/Mw2))/(Tw1 − Tw2) |  | 0.0014 | −0.0054 |
| Mw1/Mw2 |  | 0.90 | 1.14 |
| Tw1 − Tw2 | (° C.) | −32.2 | −10.6 |

The various polyethylene compositions in Tables 1A through 1G were lettered and numbered according to their approximate densities and MIs. Numbers increased as density increased, while lettering progressed as MI decreased. For example, B1, D1, and F1 all have densities below 0.900 g/cm$^3$, while B5, D5, and F5 all have densities greater than 0.950 g/cm$^3$. As a further example, B1 and B5 both have MIs greater than 7.0 g/10 min, while F1 and F5 both have MIs less than 0.30 g/10 min.

The primary polyethylene blends described in Tables 2A through 2E were made by blending one low-density polyethylene composition with one high-density polyethylene composition in an amount such that the primary polyethylene blend has a density of approximately 0.920 g/cm$^3$. D3 and Exceed 1018 are included as comparative references.

The secondary polyethylene blends shown in Tables 3A through 3H and Tables 4A through 4D were made by blending two primary polyethylene compositions. Some secondary polyethylene blends also include yet another polyethylene blend, Exceed 1018. Tables 3A through 3H show the compositions of the secondary polyethylene blends as percentages of the primary polyethylene blends and as percentages of the polyethylene compositions. Tables 3A through 3H also list the densities and MIs of the polyethylene compositions, as well as the polyethylene compositions (by wt %) of the primary polyethylene blends. Tables 4A through 4D provide additional detailed properties of the secondary polyethylene blends.

Tables 5A through 5D and 6A through 6D provide processing data for the extrusion process used to create blown films from the primary polyethylene blends and secondary polyethylene blends. All the blown films were extruded with a screw speed of 30 rpm, a blow-up ratio of 2.5, a die gap of 60 mil, and a film thickness of 1.0 mil.

TABLE 5A

Primary Blends Film Blowing Data at 1.0 mil Gauge

|  | F1B5 @ 1 mil BOCD | E2B5 @ 1 mil BOCD | F1C4 @ 1 mil BOCD | E2C4 @ 1 mil BOCD |
| --- | --- | --- | --- | --- |
| Screw Speed (rpm): | 30 | 30 | 30 | 30 |
| Specific Output (lb/hr-rpm)* | 1.47 | 1.47 | 1.47 | 1.47 |
| Die Sp. Output (lb/hr-in-die)* | 7.0 | 7.0 | 7.0 | 7.0 |
| Motor Load % | 50 | 52 | 51 | 52 |
| Melt Temperature (° F.) | 350 | 350 | 350 | 351 |
| Heat Pressure (psi) | 3,950 | 4,260 | 4,085 | 4,355 |
| Die Gap (mil) | 60 | 60 | 60 | 60 |
| Blower %: | 63 | 63 | 63 | 63 |
| Take-up (ft/min) | 98 | 96 | 96 | 96 |
| Frost Line Height (in) | 11.3 | 11.3 | 11.3 | 11.3 |
| Blow up Ratio | 2.5 | 2.5 | 2.5 | 2.5 |

*Estimated from screw rpm based on pre-established correlation

TABLE 5B

Primary Blends Film Blowing Data at 1.0 mil Gauge

|  | B1F5 @ 1 mil Conv. CD | C2F5 @ 1 mil Conv. CD |
| --- | --- | --- |
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 49 | 51 |
| Melt Temperature (° F.) | 349 | 350 |
| Heat Pressure (psi) | 3,770 | 4,065 |
| Die Gap (mil) | 60 | 60 |
| Blower %: | 60 | 60 |
| Take-up (ft/min) | 98 | 98 |
| Frost Line Height (in) | 11.3 | 11.3 |
| Blow up Ratio | 2.5 | 2.5 |

*Estimated from screw rpm based on pre-established correlation

TABLE 5C

Primary Blends Film Blowing Data at 1.0 mil Gauge

|  | B1E4 @ 1 mil Conv. CD | C2E4 @ 1 mil Conv. CD |
| --- | --- | --- |
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 50 | 51 |
| Melt Temperature (° F.) | 351 | 351 |
| Heat Pressure (psi) | 4,065 | 4,175 |
| Die Gap (mil) | 60 | 60 |
| Blower %: | 60 | 60 |
| Take-up (ft/min) | 98 | 98 |
| Frost Line Height (in) | 11.3 | 11.3 |
| Blow up Ratio | 2.5 | 2.5 |

*Estimated from screw rpm based on pre-established correlation

TABLE 5D

Primary Blends Film Blowing Data at 1.0 mil Gauge

|  | D3 @ 1 mil NMWD/NCD Control | Exceed 1018 @ 1 mil NMWD/NCD Control |
| --- | --- | --- |
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 52 | 53 |
| Melt Temperature (° F.) | 350 | 351 |
| Heat Pressure (psi) | 4,205 | 4,290 |
| Die Gap (mil) | 65 | 60 |
| Blower %: | 63 | 66 |
| Take-up (ft/min) | 98 | 97 |
| Frost Line Height (in) | 11.3 | 11.3 |
| Blow up Ratio | 2.5 | 2.5 |

*Estimated from screw rpm based on pre-established correlation

TABLE 6A

Secondary Blends Film Blowing Data at 1.0 mil Gauge

|  | Exceed 1018 (2) @ 1 mil NMWD/NCD Control | 4CB-15 @ 1 mil 50% F1B5 50% B1F5 |
| --- | --- | --- |
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 53 | 50 |
| Melt Temperature (° F.) | 351 | 348 |
| Heat Pressure (psi) | 4,220 | 3,820 |
| Die Gap (mil) | 60 | 60 |
| Blower %: | 65 | 65 |
| Take-up (ft/min) | 97 | 97 |
| Frost Line Height (in) | 11.3 | 10.3 |
| Blow up Ratio | 2.5 | 2.5 |

*Estimated from screw rpm based on pre-established correlation

TABLE 6B

Secondary Blends Film Blowing Data at 1.0 mil Gauge

|  | 4CB-24 @ 1 mil 50% E2C4 50% C2E4 | 4CB-14 @ 1 mil 50% F1C4 50% B1E4 |
| --- | --- | --- |
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 52 | 51 |
| Melt Temperature (° F.) | 350 | 349 |

TABLE 6B-continued

Secondary Blends Film Blowing Data at 1.0 mil Gauge

|  | 4CB-24<br>@ 1 mil<br>50% E2C4<br>50% C2E4 | 4CB-14<br>@ 1 mil<br>50% F1C4<br>50% B1E4 |
|---|---|---|
| Heat Pressure (psi) | 4,205 | 4,065 |
| Die Gap (mil) | 60 | 60 |
| Blower %: | 65 | 65 |
| Take-up (ft/min) | 97 | 97 |
| Frost Line Height (in) | 10.8 | 10.8 |
| Blow up Ratio | 2.5 | 2.5 |

*Estimated from screw rpm based on pre-established correlation

TABLE 6C

Secondary Blends Film Blowing Data at 1.0 mil Gauge

|  | 4CB-25<br>@ 1 mil<br>50% E2B5<br>50% C2F5 | 5CB-135<br>@ 1 mil<br>40% F1B5<br>20% Exceed<br>40% B1F5 |
|---|---|---|
| Screw Speed (rpm): | 30 | 30 |
| Specific Output (lb/hr-rpm)* | 1.47 | 1.47 |
| Die Sp. Output (lb/hr-in-die)* | 7.0 | 7.0 |
| Motor Load % | 51 | 50 |
| Melt Temperature (° F.) | 350 | 350 |
| Heat Pressure (psi) | 4,050 | 3,950 |
| Die Gap (mil) | 60 | 60 |
| Blower %: | 65 | 65 |
| Take-up (ft/min) | 97 | 97 |
| Frost Line Height (in) | 11.0 | 10.3 |
| Blow up Ratio | 2.5 | 2.5 |

*Estimated from screw rpm based on pre-established correlation

TABLE 6D

Secondary Blends Film Blowing Data at 1.0 mil Gauge

|  | 5CB-234<br>@ 1 mil<br>40% E2C4<br>20% Exceed<br>40% C2E4 | 9CB-12345<br>@ 1 mil<br>22% F1B5<br>22% E2C4<br>12% Exceed<br>22% B1F5<br>22% C2E4 |
|---|---|---|
| Screw Speed (rpm): | 30 | 30 |
| Specific Output (lb/hr-rpm)* | 1.47 | 1.47 |

TABLE 6D-continued

Secondary Blends Film Blowing Data at 1.0 mil Gauge

|  | 5CB-234<br>@ 1 mil<br>40% E2C4<br>20% Exceed<br>40% C2E4 | 9CB-12345<br>@ 1 mil<br>22% F1B5<br>22% E2C4<br>12% Exceed<br>22% B1F5<br>22% C2E4 |
|---|---|---|
| Die Sp. Output (lb/hr-in-die)* | 7.0 | 7.0 |
| Motor Load % | 52 | 50 |
| Melt Temperature (° F.) | 350 | 350 |
| Heat Pressure (psi) | 4,280 | 4,050 |
| Die Gap (mil) | 60 | 60 |
| Blower %: | 65 | 65 |
| Take-up (ft/min) | 97 | 97 |
| Frost Line Height (in) | 10.8 | 10.8 |
| Blow up Ratio | 2.5 | 2.5 |

*Estimated from screw rpm based on pre-established correlation

Example II

Figure 2A:
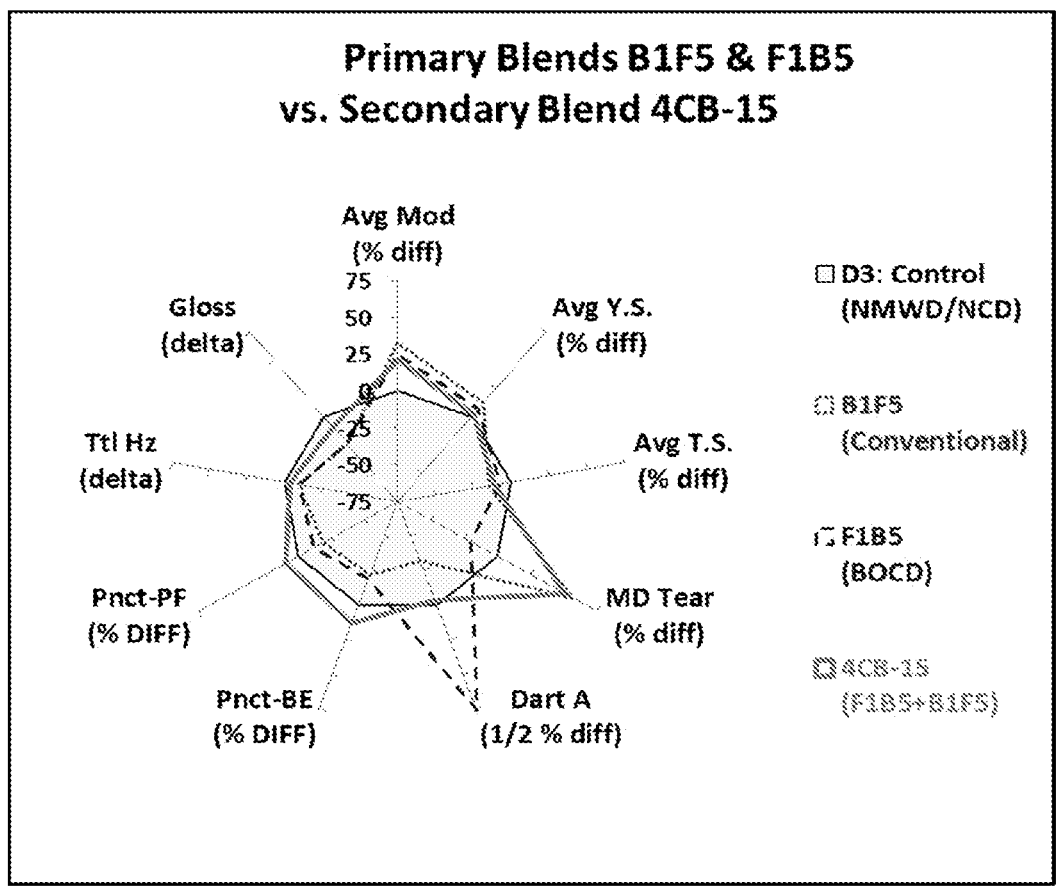
FIG. 2A and FIG. 2B are graphs showing the unexpected synergistic effects of the secondary polyethylene blends over the primary polyethylene blends leading to unprecedented combination of desirable features over the controls.
Figure 2B:
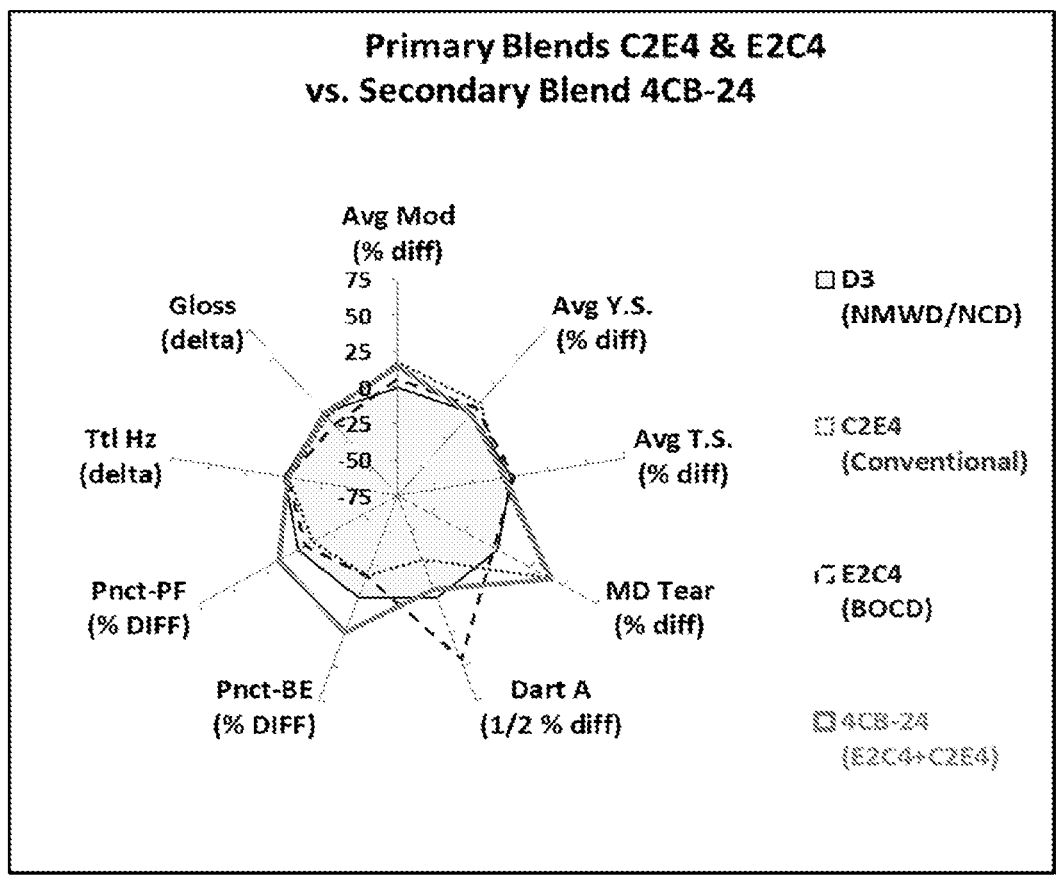

Mechanical properties are important film characteristics, as polyethylene films typically face a multitude of forces throughout their lifetime. Therefore, these properties were investigated in blown films made from the secondary polyethylene blends and primary polyethylene blends of Example I. FIG. 2A and FIG. 2B provide a comparison of properties of blown films made from secondary polyethylene blends, blown films made only of the primary polyethylene blends (sometimes referred to as a parents or parental blend), and a blown film made from the polyethylene composition referred to as reference D3.

Both of the blown films made from secondary polyethylene blends in FIG. 2A and FIG. 2B show improved, or nearly equivalent, mechanical properties as compared to the reference D3. The secondary polyethylene blends also show notably improved puncture peak force and puncture break energy over both parents. The secondary polyethylene blends have Elmendorf tear in MD similar to their parent with higher Elmendorf tear in MD, all of which have greatly improved tear over the reference D3.

Tables 7A through 7D and Tables 8A through 8C show mechanical properties of 1.0 mil-thick blown films produced from the primary polyethylene blends (Tables 7A through 7D) and secondary polyethylene blends (Tables 8A through 8C).

TABLE 7A

Primary Blends Film Property at 1.0 mil

|  | Method Used | F1B5<br>@ 1 mil | E2B5<br>@ 1 mil | F1C4<br>@ 1 mil |
|---|---|---|---|---|
| Gauge Mic (mils) | ASTM D6988 |  |  |  |
| Average |  | 1.13 | 1.13 | 1.16 |
| 1% Secant (psi) | ExxonMobil |  |  |  |
| MD |  | 30,051 | 27,929 | 33,045 |
| TD |  | 43,568 | 32,842 | 38,065 |
| Avg |  | 36,810 | 30,386 | 35,555 |
| Tensile<br>Yield Strength(psi) | ExxonMobil |  |  |  |
| MD |  | 1,350 | 1,244 | 1,463 |
| TD |  | 1,666 | 1,403 | 1,666 |

TABLE 7A-continued

| Primary Blends Film Property at 1.0 mil | | | | |
|---|---|---|---|---|
| | Method Used | F1B5 @ 1 mil | E2B5 @ 1 mil | F1C4 @ 1 mil |
| Elongation @ Yield (%) | | | | |
| MD | | 5.7 | 5.4 | 6.0 |
| TD | | 7.0 | 5.6 | 5.9 |
| Tensile Strength (psi) | | | | |
| MD | | 7,642 | 8,058 | 8,297 |
| TD | | 8,275 | 9,004 | 8,214 |
| Elongation @ Break (%) | | | | |
| MD | | 396 | 417 | 439 |
| TD | | 590 | 602 | 650 |
| Elmendorf Tear | ASTM D1922 | | | |
| MD (g/mil) | | 225 | 247 | 365 |
| TD (g/mil) | | 411 | 440 | 537 |
| Haze (%) | ASTM D1003 | 15.5 | 10.8 | 10.5 |
| Internal (%) | ExxonMobil | 3.92 | 2.71 | 3.08 |
| Gloss (GU) | ASTM D2457 | | | |
| MD | | 37 | 46 | 47 |
| TD | | 44 | 55 | 58 |
| Dart Drop Phenolic Method A (g/mil) | ExxonMobil | 979 | 894 | 597 |
| Puncture BTEC Probe B1 | ExxonMobil | | | |
| Peak Force (lbs/mil) | | 9.84 | 10.68 | 9.86 |
| Break Energy (in-lbs/mil) | | 28.14 | 31.74 | 27.92 |
| Heat Seal | ExxonMobil | | | |
| Heat seal temp @ 1 N (° C.) | | 86.0 | <95 | 90.6 |
| Heat seal temp @ 5 N (° C.) | | 90.1 | 97.2 | 96.9 |
| Max. Heat Seal (N) | | 14.2 | 13.0 | 14.8 |
| Hot Tack | ExxonMobil | | | |
| Hot tack temp @ 1 N (° C.) | | 84.4 | 92.7 | 93.0 |
| Hot tack temp @ 5 N (° C.) | | 89.7 | 100.2 | 100.4 |
| Max. Hot Tack (N) | | 14.6 | 13.0 | 11.8 |

TABLE 7B

| Primary Blends Film Property at 1.0 mil | | | | |
|---|---|---|---|---|
| | Method Used | E2C4 @ 1 mil | B1F5 @ 1 mil | C2F5 @ 1 mil |
| Gauge Mic (mils) | ASTM D6988 | | | |
| Average | | 1.13 | 1.08 | 1.16 |
| 1% Secant (psi) | ExxonMobil | | | |
| MD | | 29,039 | 35,359 | 30,553 |
| TD | | 33,097 | 42,595 | 34,492 |
| Avg | | 31,068 | 38,977 | 32,523 |
| Tensile Yield Strength(psi) | ExxonMobil | | | |
| MD | | 1,418 | 1,483 | 1,380 |
| TD | | 1,540 | 1,703 | 1,459 |
| Elongation @ Yield (%) | | | | |
| MD | | 6.1 | 6.5 | 6.6 |
| TD | | 6.1 | 5.8 | 5.8 |
| Tensile Strength (psi) | | | | |
| MD | | 9,040 | 7,544 | 8,015 |
| TD | | 8,360 | 7,037 | 7,204 |
| Elongation @ Break (%) | | | | |
| MD | | 452 | 728 | 630 |
| TD | | 623 | 774 | 680 |
| Elmendorf Tear | ASTM D1922 | | | |
| MD (g/mil) | | 275 | 442 | 422 |
| TD (g/mil) | | 455 | 622 | 641 |
| Haze (%) | ASTM D1003 | 7.7 | 15.5 | 12.3 |

TABLE 7B-continued

| | | Primary Blends Film Property at 1.0 mil | | |
|---|---|---|---|---|
| | Method Used | E2C4 @ 1 mil | B1F5 @ 1 mil | C2F5 @ 1 mil |
| Internal (%) Gloss (GU) | ExxonMobil ASTM D2457 | 3.02 | 4.45 | 5.07 |
| MD | | 48 | 37 | 44 |
| TD | | 59 | 46 | 42 |
| Dart Drop Phenolic Method A (g/mil) | ExxonMobil | 735 | 138 | 263 |
| Puncture BTEC Probe B1 | ExxonMobil | | | |
| Peak Force (lbs/mil) | | 10.51 | 9.00 | 9.06 |
| Break Energy (in-lbs/mil) | | 29.27 | 27.10 | 27.21 |
| Heat Seal | ExxonMobil | | | |
| Heat seal temp @ 1 N (° C.) | | 95.0 | 75.5 | 85.6 |
| Heat seal temp @ 5 N (° C.) | | 100.8 | 82.1 | 91.9 |
| Max. Heat Seal (N) | | 13.4 | 15.4 | 14.8 |
| Hot Tack | ExxonMobil | | | |
| Hot tack temp @ 1 N (° C.) | | 96.3 | 82.4 | 88.6 |
| Hot tack temp @ 5 N (° C.) | | 101.2 | 116.7 | 94.4 |
| Max. Hot Tack (N) | | 12.1 | 5.8 | 6.9 |

TABLE 7C

| | | Primary Blends Film Property at 1.0 mil | | |
|---|---|---|---|---|
| | Method Used | B1E4 @ 1 mil | C2E4 @ 1 mil | D3 @ 1 mil |
| Gauge Mic (mils) Average | ASTM D6988 | 1.13 | 1.15 | 1.14 |
| 1% Secant (psi) | ExxonMobil | | | |
| MD | | 37,078 | 32,511 | 28,251 |
| TD | | 44,490 | 36,527 | 30,499 |
| Avg | | 40,784 | 34,519 | 29,375 |
| Tensile Yield Strength(psi) | ExxonMobil | | | |
| MD | | 1,627 | 1,494 | 1,366 |
| TD | | 1,852 | 1,600 | 1,472 |
| Elongation @ Yield (%) | | | | |
| MD | | 7.4 | 5.9 | 6.0 |
| TD | | 5.9 | 5.8 | 5.8 |
| Tensile Strength (psi) | | | | |
| MD | | 7,630 | 8,426 | 8,483 |
| TD | | 7,297 | 7,743 | 8,660 |
| Elongation @ Break (%) | | | | |
| MD | | 603 | 583 | 488 |
| TD | | 765 | 717 | 661 |
| Elmendorf Tear | ASTM D1922 | | | |
| MD (g/mil) | | 298 | 391 | 283 |
| TD (g/mil) | | 635 | 559 | 440 |
| Haze (%) | ASTM D1003 | 10.9 | 8.7 | 5.9 |
| Internal (%) Gloss (GU) | ExxonMobil ASTM D2457 | 3.1 | 6.14 | 2.24 |
| MD | | 48 | 65 | 66 |
| TD | | 53 | 57 | 63 |
| Dart Drop Phenolic Method A (g/mil) | ExxonMobil | 121 | 171 | 386 |
| Puncture BTEC Probe B1 | ExxonMobil | | | |
| Peak Force (lbs/mil) | | 9.58 | 9.92 | 11.12 |
| Break Energy (in-lbs/mil) | | 27.38 | 29.03 | 34.62 |
| Heat Seal | ExxonMobil | | | |
| Heat seal temp @ 1 N (° C.) | | <90 | 91.4 | <105 |
| Heat seal temp @ 5 N (° C.) | | 97.1 | 97.2 | 107.1 |
| Max. Heat Seal (N) | | 15.1 | 14.2 | 13.1 |

TABLE 7C-continued

Primary Blends Film Property at 1.0 mil

| | Method Used | B1E4 @ 1 mil | C2E4 @ 1 mil | D3 @ 1 mil |
|---|---|---|---|---|
| Hot Tack | ExxonMobil | | | |
| Hot tack temp @ 1 N (° C.) | | 100.5 | 97.9 | 103.5 |
| Hot tack temp @ 5 N (° C.) | | 114.5 | 103.7 | 110.6 |
| Max. Hot Tack (N) | | 5.4 | 6.8 | 9.7 |

TABLE 7D

Primary Blends Film Property at 1.0 mil

| | Method Used | Excd 1018 (1) @ 1 mil |
|---|---|---|
| Gauge Mic (mils) | ASTM D6988 | |
| Average | | 1.15 |
| 1% Secant (psi) | ExxonMobil | |
| MD | | 26,516 |
| TD | | 29,456 |
| Avg | | 27,986 |
| Tensile Yield Strength(psi) | ExxonMobil | |
| MD | | 1,364 |
| TD | | 1,400 |
| Elongation @ Yield (%) | | |
| MD | | 6.4 |
| TD | | 5.6 |
| Tensile Strength (psi) | | |
| MD | | 10,252 |
| TD | | 9,263 |
| Elongation @ Break (%) | | |
| MD | | 479 |
| TD | | 624 |
| Elmendorf Tear | ASTM D1922 | |
| MD (g/mil) | | 257 |
| TD (g/mil) | | 422 |
| Haze (%) | ASTM D1003 | 8.9 |
| Internal (%) | ExxonMobil | 2.12 |
| Gloss (GU) | ASTM D2457 | |
| MD | | 58 |
| TD | | 57 |
| Dart Drop Phenolic Method A (g/mil) | ExxonMobil | 597 |
| Puncture BTEC Probe B1 | ExxonMobil | |
| Peak Force (lbs/mil) | | 11.16 |
| Break Energy (in-lbs/mil) | | 34.63 |
| Heat Seal | ExxonMobil | |
| Heat seal temp @ 1 N (° C.) | | 100.2 |
| Heat seal temp @ 5 N (° C.) | | 102.5 |
| Max. Heat Seal (N) | | 13.4 |
| Hot Tack | ExxonMobil | |
| Hot tack temp @ 1 N (° C.) | | 100.4 |
| Hot tack temp @ 5 N (° C.) | | 104.9 |
| Max. Hot Tack (N) | | 11.0 |

TABLE 8A

Secondary Blends Film Property at 1.0 mil

| | Method Used | Exceed-2 | 4CB-15 | 4CB-24 |
|---|---|---|---|---|
| Gauge Mic (mils) | ASTM D6988 | | | |
| Average | | 1.2 | 1.1 | 1.2 |
| 1% Secant (psi) | ExxonMobil | | | |
| MD | | 25,346 | 32,433 | 31,097 |
| TD | | 27,047 | 38,595 | 36,182 |
| Avg | | 26,197 | 35,514 | 33,640 |
| Tensile Yield Strength(psi) | ExxonMobil | | | |
| MD | | 1,246 | 1,337 | 1,356 |
| TD | | 1,316 | 1,554 | 1,465 |
| Elongation @ Yield (%) | | | | |
| MD | | 6.7 | 6.1 | 5.9 |
| TD | | 6.0 | 6.4 | 5.8 |
| Tensile Strength (psi) | | | | |
| MD | | 8,644 | 7,996 | 8,358 |
| TD | | 8,024 | 7,246 | 8,137 |
| Elongation @ Break (%) | | | | |
| MD | | 500 | 559 | 526 |
| TD | | 635 | 703 | 707 |
| Elmendorf Tear | ASTM D1922 | | | |
| MD (g/mil) | | 247 | 427 | 397 |
| TD (g/mil) | | 396 | 568 | 534 |
| Haze (%) | ASTM D1003 | 11.3 | 9.5 | 8.2 |
| Internal (%) | ExxonMobil | 3.0 | 4.0 | 2.9 |

TABLE 8A-continued

Secondary Blends Film Property at 1.0 mil

| | Method Used | Exceed-2 | 4CB-15 | 4CB-24 |
|---|---|---|---|---|
| Gloss (GU) | ASTM D2457 | | | |
| MD | | 38 | 55 | 63 |
| TD | | 40 | 56 | 66 |
| Dart Drop Phenolic Method A | ExxonMobil | | | |
| (g/mil) | | 716 | 360 | 338 |
| Puncture BTEC Probe B1 | ExxonMobil | | | |
| Peak Force (lbs/mil) | | 12.51 | 12.19 | 12.76 |
| Break Energy (in-lbs/mil) | | 35.72 | 39.17 | 43.52 |
| Heat Seal | ExxonMobil | | | |
| Heat seal temp @ 1 N (° C.) | | 102 | 91 | 97 |
| Heat seal temp @ 5 N (° C.) | | 102 | 92 | 97 |
| Max. Heat Seal (N) | | 13.8 | 15.2 | 14.1 |
| Hot Tack | ExxonMobil | | | |
| Hot tack temp @ 1 N (° C.) | | 101 | 89 | 96 |
| Hot tack temp @ 5 N (° C.) | | 111 | 102 | 103 |
| Max. Hot Tack (N) | | 15.2 | 9.8 | 8.6 |

TABLE 8B

Secondary Blends Film Property at 1.0 mil

| | Method Used | 4CB-14 | 4CB-25 | 5CB-135 |
|---|---|---|---|---|
| Gauge Mic (mils) | ASTM D6988 | | | |
| Average | | 1.2 | 1.2 | 1.2 |
| 1% Secant (psi) | ExxonMobil | | | |
| MD | | 32,549 | 28,758 | 30,753 |
| TD | | 39,151 | 32,756 | 34,839 |
| Avg | | 35,850 | 30,757 | 32,796 |
| Tensile Yield Strength(psi) | ExxonMobil | | | |
| MD | | 1,520 | 1,293 | 1,341 |
| TD | | 1,627 | 1,398 | 1,453 |
| Elongation @ Yield (%) | | | | |
| MD | | 6.9 | 6.4 | 6.6 |
| TD | | 6.0 | 6.2 | 6.0 |
| Tensile Strength (psi) | | | | |
| MD | | 7,643 | 8,390 | 7,884 |
| TD | | 7,885 | 8,076 | 7,785 |
| Elongation @ Break (%) | | | | |
| MD | | 535 | 531 | 538 |
| TD | | 752 | 681 | 715 |
| Elmendorf Tear | ASTM D1922 | | | |
| MD (g/mil) | | 432 | 420 | 439 |
| TD (g/mil) | | 527 | 535 | 547 |
| Haze (%) | ASTM D1003 | 9.5 | 11.3 | 9.2 |
| Internal (%) | ExxonMobil | 3.7 | 3.5 | 4.0 |
| Gloss (GU) | ASTM D2457 | | | |
| MD | | 64 | 51 | 43 |
| TD | | 64 | 56 | 47 |
| Dart Drop Phenolic Method A | ExxonMobil | | | |
| (g/mil) | | 190 | 515 | 377 |
| Puncture BTEC Probe B1 | ExxonMobil | | | |
| Peak Force (lbs/mil) | | 12.74 | 12.83 | 9.62 |
| Break Energy (in-lbs/mil) | | 39.77 | 42.72 | 27.01 |
| Heat Seal | ExxonMobil | | | |
| Heat seal temp @ 1 N (° C.) | | 95 | 91 | 87 |
| Heat seal temp @ 5 N (° C.) | | 95 | 92 | 88 |
| Max. Heat Seal (N) | | 14.8 | 14.9 | 14.9 |

TABLE 8B-continued

Secondary Blends Film Property at 1.0 mil

| | Method Used | 4CB-14 | 4CB-25 | 5CB-135 |
|---|---|---|---|---|
| Hot Tack | ExxonMobil | | | |
| Hot tack temp @ 1 N (° C.) | | 98 | 91 | 93 |
| Hot tack temp @ 5 N (° C.) | | 106 | 98 | 103 |
| Max. Hot Tack (N) | | 9.9 | 8.9 | 8.1 |

TABLE 8C

Secondary Blends Film Property at 1.0 mil

| | Method Used | 5CB-234 | 9CB-12345 |
|---|---|---|---|
| Gauge Mic (mils) | ASTM D6988 | | |
| Average | | 1.1 | 1.2 |
| 1% Secant (psi) | ExxonMobil | | |
| MD | | 29,025 | 30,194 |
| TD | | 33,495 | 34,715 |
| Avg | | 31,260 | 32,455 |
| Tensile | ExxonMobil | | |
| Yield Strength(psi) | | | |
| MD | | 1,363 | 1,367 |
| TD | | 1,445 | 1,432 |
| Elongation @ Yield (%) | | | |
| MD | | 6.4 | 6.1 |
| TD | | 6.0 | 5.5 |
| Tensile Strength (psi) | | | |
| MD | | 8,128 | 7,857 |
| TD | | 7,612 | 7,133 |
| Elongation @ Break (%) | | | |
| MD | | 518 | 520 |
| TD | | 666 | 664 |
| Elmendorf Tear | ASTM D1922 | | |
| MD (g/mil) | | 363 | 395 |
| TD (g/mil) | | 522 | 563 |
| Haze (%) | ASTM D1003 | 9.5 | 7.5 |
| Internal (%) | ExxonMobil | 4.1 | 4.0 |
| Gloss (GU) | ASTM D2457 | | |
| MD | | 69 | 58 |
| TD | | 71 | 59 |
| Dart Drop | ExxonMobil | | |
| Phenolic | | | |
| Method A | | | |
| (g/mil) | | 291 | 353 |
| Puncture | ExxonMobil | | |
| BTEC Probe B1 | | | |
| Peak Force (lbs/mil) | | 12.18 | 12.20 |
| Break Energy (in-lbs/mil) | | 38.12 | 38.02 |
| Heat Seal | ExxonMobil | | |
| Heat seal temp @ 1 N (° C.) | | 99 | 93 |
| Heat seal temp @ 5 N (° C.) | | 100 | 94 |
| Max. Heat Seal (N) | | 14.7 | 15.2 |
| Hot Tack | ExxonMobil | | |
| Hot tack temp @ 1 N (° C.) | | 100 | 97 |
| Hot tack temp @ 5 N (° C.) | | 106 | 103 |
| Max. Hot Tack (N) | | 11.0 | 10.6 |

Tables 7A through 7D and Tables 8A through 8C show that blown films made from the secondary polyethylene blends generally have improved puncture peak force, puncture break energy, Elmendorf Tear in MD and glossiness (in both MD and TD) when compared to blown films made only from either of the primary polyethylene blends. With these improved properties, blown films made from the secondary polyethylene blends can maintain a similar heat seal initiation temperature at 5 N, hot tack seal initiation temperature at 1 N, and average MD/TD 1% secant modulus as the primary polyethylene blends. Generally, blown films made from the secondary polyethylene blends had dart drop (dart drop impact or dart impact) values that fall between the values of the primary polyethylene blends, suggesting that this property could be adjusted through the wt % of primary polyethylene blends.

Figure 3:
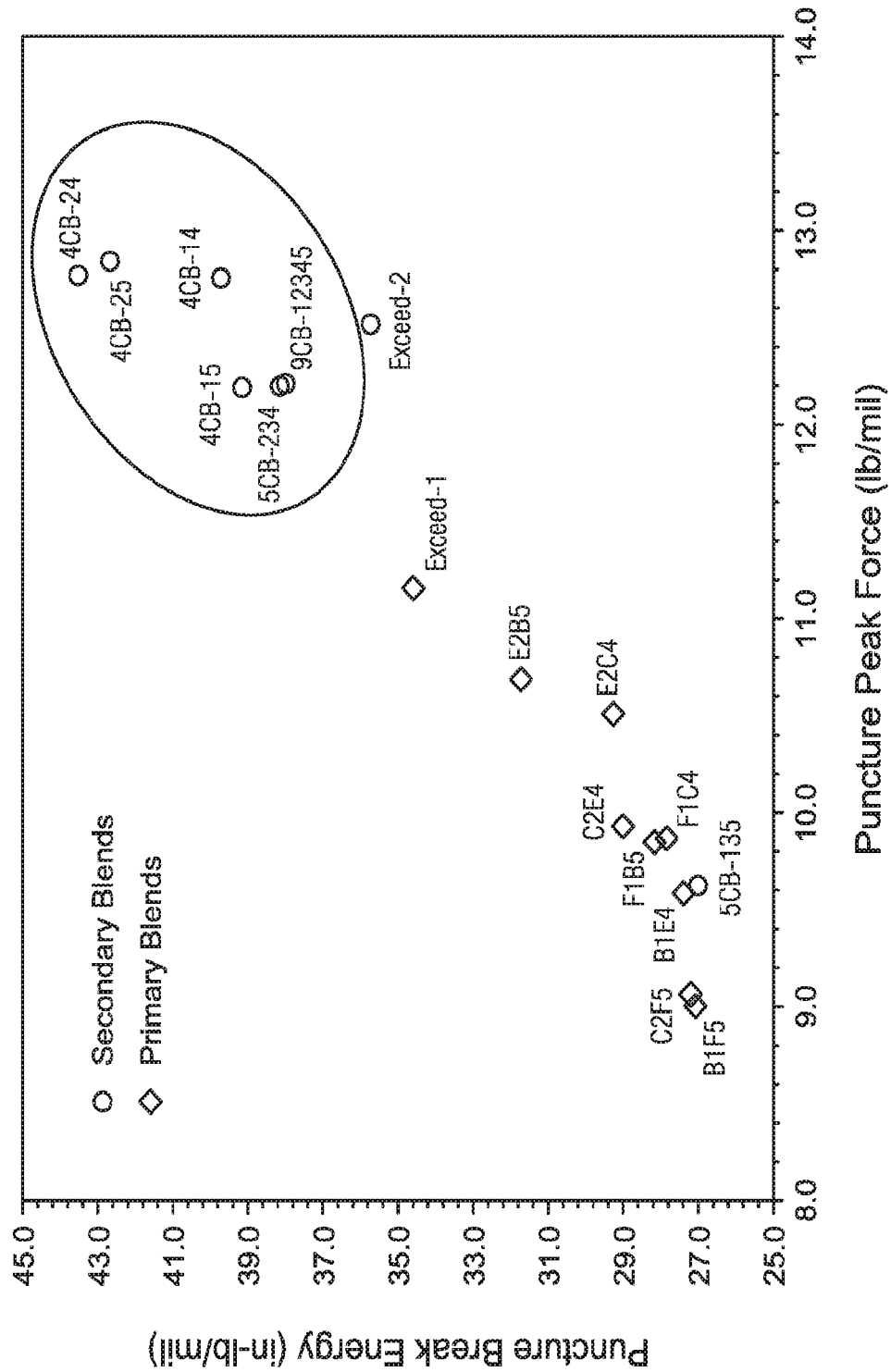
FIG. 3 is a graph of puncture of the secondary polyethylene blends and the primary polyethylene blends described herein.

Puncture properties were investigated (FIG. 3). With one exception, the secondary polyethylene blends demonstrated significantly improved puncture peak force and puncture break energy over the primary polyethylene blends.

Figure 4:
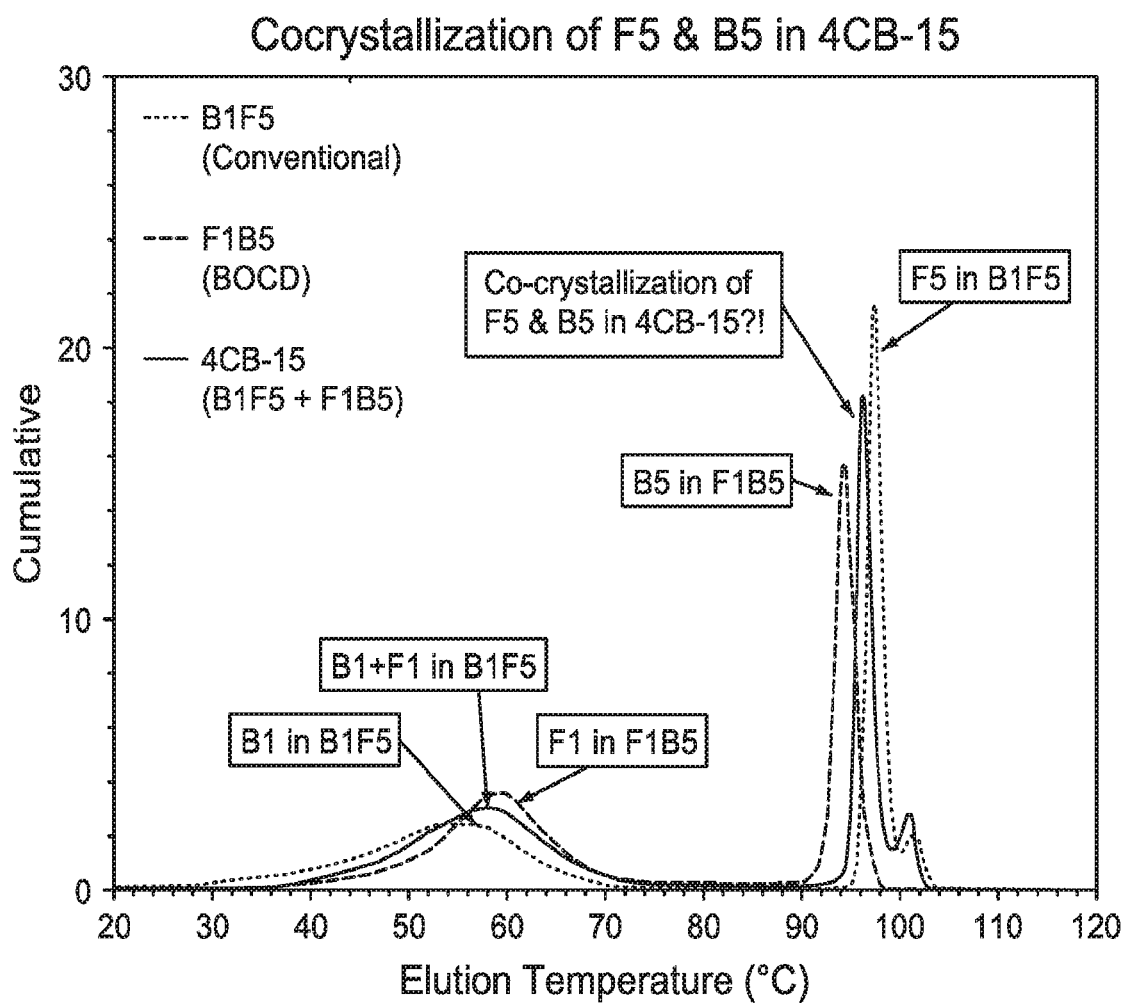
FIG. 4 is a Temperature Rising Elution Fractionation ("TREF") curves of the secondary polyethylene blend described herein and the primary polyethylene blends. Co-crystallization (change of crystallization behavior) is shown between polyethylene compositions F5 and B5 in the secondary blend. This may explain the unexpected synergistic effectors in puncture for example.

FIG. 4 shows a plot of the resultant elution peaks from a TREF experiment on a secondary polyethylene blend and the primary polyethylene blends. The secondary polyethylene blend yields peaks in between the primary polyethylene blends, suggesting that some co-crystallization occurs between the polyethylene compositions. This co-crystallization could account for the synergistically improved mechanical properties of the secondary polyethylene blends over the primary polyethylene blends.

Figure 5A:
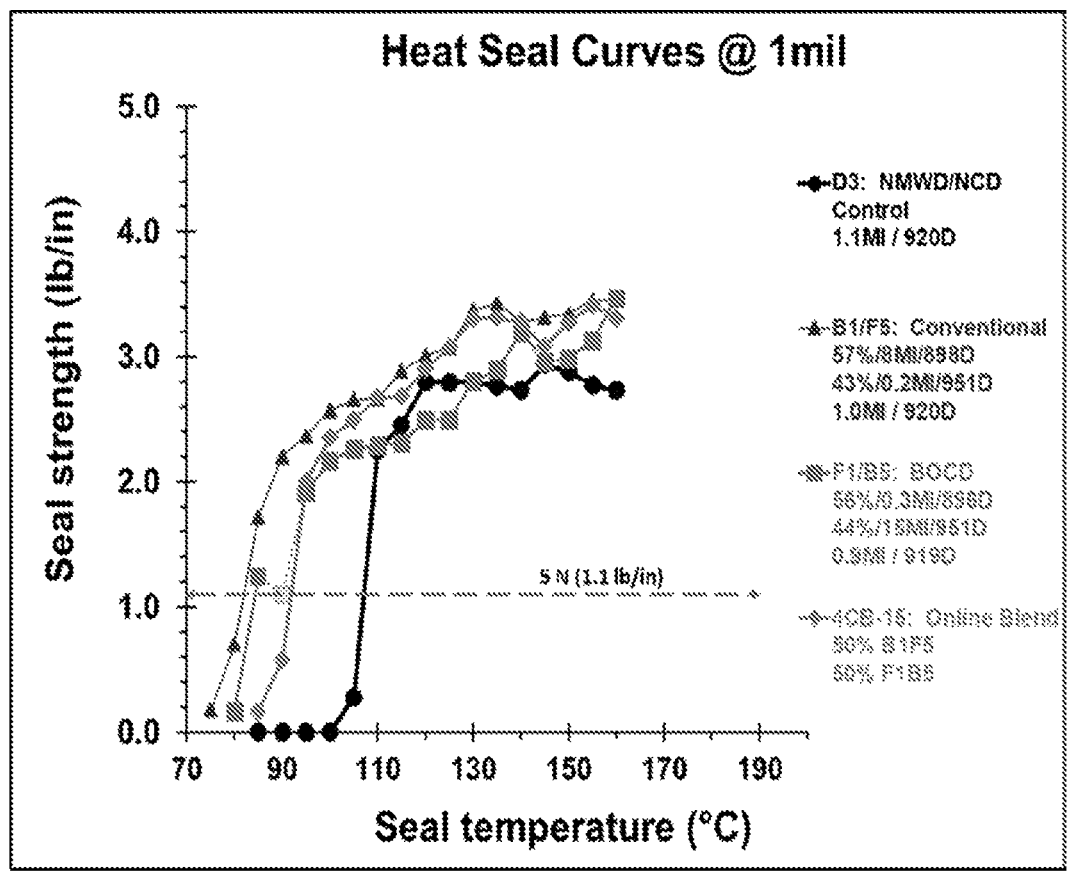
FIG. 5A is a graph of heat seal curves of film at 1 mil and shows heat seal strength as a function of seal temperature for films made from the secondary polyethylene blend 4CB-15. This secondary polyethylene blend exhibits 10 to 20° C. lower seal initiation temperature than the control of the same nominal density and MI.
Figure 5B:
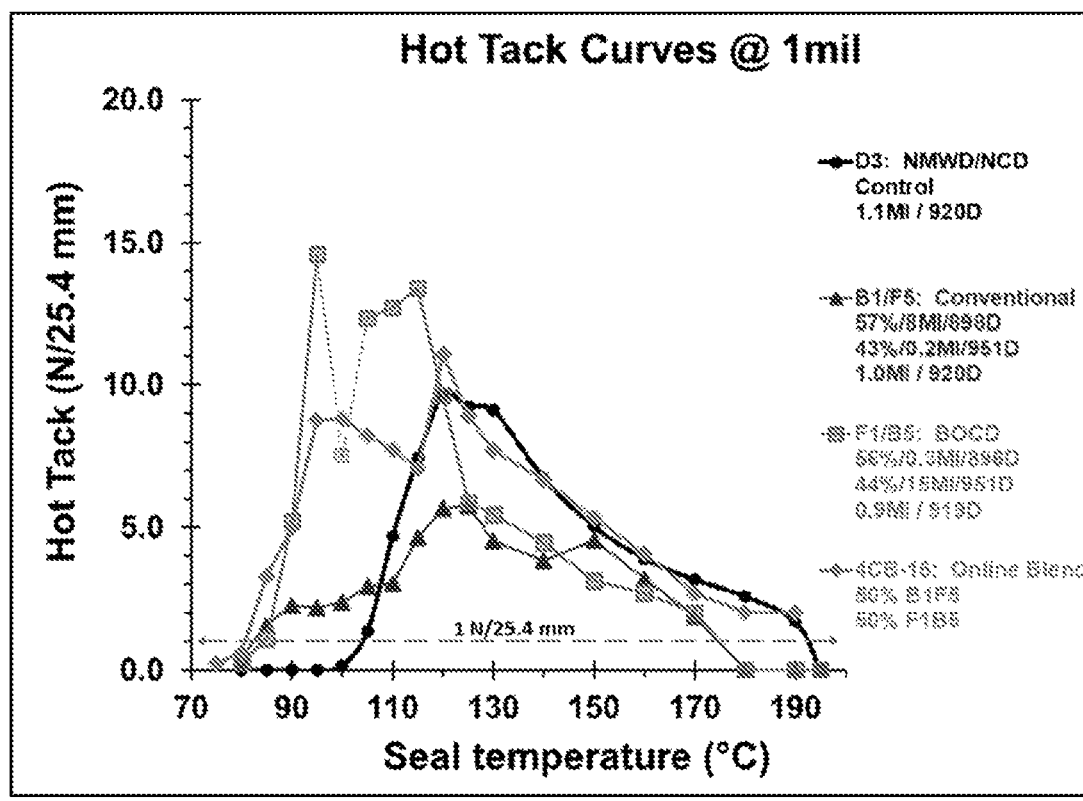
FIG. 5B is a graph of hot tack curves at 1 mil, showing hot tack seal strength as a function of seal temperature for films made of the secondary polyethylene blend 4CB-15. This secondary polyethylene blend exhibits 20+° C. lower seal initiation temperature than the control of the same nominal density and MI.

Heat seal and hot tack curves are shown FIG. 5A and FIG. 5B, respectively, for 1 mil blown films made from one secondary polyethylene blend, the primary polyethylene blends and the reference D3. The secondary polyethylene blend and the primary polyethylene blends had better sealing properties than the reference D3. That is, each generally had a lower heat seal initiation temperature at 5 N, a lower hot tack seal initiation temperature at 1 N, a higher max heat seal strength, and a higher max hot tack strength when compared to the reference D3.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A film comprising a secondary polyethylene blend, the secondary polyethylene blend comprising a first primary polyethylene blend and a second primary polyethylene blend, the first primary polyethylene blend and the second primary polyethylene blend each comprising two polyethylene compositions, each having a density, wherein the density of each of the polyethylene compositions differs from the other in an amount between about 0.050 g/cm$^3$ and about 0.060 g/cm$^3$; and further wherein the film has (i) an average MD/TD 1% secant modulus greater than or equal to about 3300 psi and (ii) either (ii-a) a heat seal initiation temperature at 5 N of less than or equal to about 95° C. or (ii-b) a heat seal initiation temperature at 1 N of less than or equal to about 95° C.

2. The film of claim 1, wherein the first polyethylene blend and the second polyethylene blend each has a density between about 0.918 g/cm$^3$ and about 0.922 g/cm$^3$, and an MI (I$_2$) between about 0.90 g/10 min and about 1.10 g/10 min.

3. The film of claim 1, wherein each polyethylene composition of each primary polyethylene blend has a density between about 0.890 g/cm$^3$ and about 0.960 g/cm$^3$.

4. The film of claim 1, wherein each of the polyethylene compositions has an MI (I$_2$) between about between about 0.1 g/10 min and about 15.0 g/10 min.

5. The film of claim 1, wherein film has a thickness of about 1 mil or about 3 mil.

6. The film of claim 1, wherein the first primary polyethylene blend comprises a first polyethylene composition having a density of about 0.8961 g/cm$^3$ and a second polyethylene composition having a density of about 0.9510 g/cm$^3$.

7. The film of claim 6, wherein the first primary polyethylene blend comprises the first polyethylene composition in an amount between about 55 wt % and about 57 wt % and has an MI (I$_2$) of about 0.3 g/10 min.

8. The film of claim 6, wherein the first primary polyethylene blend comprises the second polyethylene composition in an amount between about 43 wt % and about 45 wt % and has an MI (I$_2$) of about 15.0 g/10 min.

9. The film of claim 1, wherein the second primary polyethylene blend comprises a first polyethylene composition having a density of about 0.8983 g/cm$^3$ and a second the other polyethylene composition has a density of about 0.9516 g/cm$^3$.

10. The film of claim 9, wherein the second primary polyethylene blend comprises the first polyethylene composition in an amount between about 56 wt % and about 58 wt % and has an MI (I$_2$) of about 7.8 g/10 min.

11. The film of claim 9, wherein the second primary polyethylene blend comprises the second polyethylene composition in an amount between about 42 wt % and about 44 wt % and has an MI (I$_2$) of about 0.2 g/10 min.

12. The film of claim 1, wherein each of the polyethylene compositions has an M$_w$/M$_n$ between about 2.5 and about 4.0.

13. A film having an average MD/TD 1% secant modulus greater than or equal to about 3300 psi, a heat seal initiation temperature at 5 N of less than or equal to about 95° C., and a hot tack seal initiation temperature at 1 N of less than or equal to about 95° C., the film comprising a secondary polyethylene blend comprising two primary polyethylene blends, each primary polyethylene blend having a density between about 0.918 g/cm$^3$ and about 0.922 g/cm$^3$ and an MI (I$_2$) between about 0.90 g/10 min and about 1.10 g/10 min, wherein each primary polyethylene blend comprises two polyethylene compositions, each of the polyethylene compositions having a density between about 0.890 g/cm$^3$ and about 0.960 g/cm$^3$ and an MI (I$_2$) between about 0.1 g/10 min and about 15.0 g/10 min, wherein the density of each of the polyethylene compositions differs from the other in an amount of about 0.055 g/cm$^3$.

14. A film comprising a secondary polyethylene blend, the secondary polyethylene blend comprising a first polyethylene blend component and a second polyethylene blend component, wherein:

the first polyethylene blend component has a broad orthogonal comonomer distribution, and furthermore comprises either (i) two polyethylene compositions having a density spread of from about 0.050 g/cm$^3$ and about 0.060 g/cm$^3$ or (ii) a single polyethylene composition that exhibits at least a first peak and a second peak in a comonomer distribution analysis; and the second polyethylene blend component has a substantially uniform comonomer distribution and comprises two polyethylene compositions having a density spread of about 0.050 g/cm$^3$ to about 0.060 g/cm$^3$.

15. The film of claim 14, wherein each of the polyethylene compositions independently has:

a density between about 0.890 g/cm$^3$ and about 0.960 g/cm$^3$;

an MI (I$_2$) between about 0.90 g/10 min and about 1.10 g/10 min; or a combination thereof.

16. The film of claim 14, wherein the first polyethylene blend component and the second polyethylene blend component each independently has:

a density between about 0.918 g/cm$^3$ and about 0.922 g/cm$^3$;

an MI (I$_2$) between about 0.1 g/10 min and about 15.0 g/10 min; or a combination thereof.

17. The film of claim 14, wherein the film has an average MD/TD 1% secant modulus greater than or equal to about 3300 psi, a heat seal initiation temperature at 5 N of less than or equal to about 95° C., and a hot tack seal initiation temperature at 1 N of less than or equal to about 95° C.

18. The film of claim 14, wherein the first polyethylene blend component exhibits at least a first peak and a second peak in a comonomer distribution analysis, wherein the first peak has a maximum at a log(M$_w$) value of 4.0 to 5.4 and a TREF elution temperature of 70.0° C. to 100° C., and the second peak has a maximum at a log(M$_w$) value of 5.0 to 6.0 and a TREF elution temperature of 5° C. to 60°.

19. The film of claim 14, wherein comonomer contents of polymer fractions across the molecular weight range of the second primary polyethylene blend vary by <10.0 wt %.

* * * * *